US006403209B1

(12) United States Patent
Barton et al.

(10) Patent No.: US 6,403,209 B1
(45) Date of Patent: Jun. 11, 2002

(54) CONSTITUTION AND FABRICATION OF FLAT-PANEL DISPLAY AND POROUS-FACED STRUCTURE SUITABLE FOR PARTIAL OR FULL USE IN SPACER OF FLAT-PANEL DISPLAY

(75) Inventors: Roger W. Barton, Tofte, MN (US); Michael J. Nystrom; Bob L. Mackey, both of San Jose, CA (US); Lawrence S. Pan, Los Gatos, CA (US); Shiyou Pei, San Jose, CA (US); Stephen Wallace; Douglas M. Smith, both of Albuquerque, NM (US)

(73) Assignees: Candescent Technologies Corporation; Candescent Intellectual Property Services, Inc., both of San Jose, CA (US); NanoPore Incorporated, Albuquerque, NM (US)

( * ) Notice: Subject to any disclaimer, the term of this patent is extended or adjusted under 35 U.S.C. 154(b) by 0 days.

(21) Appl. No.: 09/209,863

(22) Filed: Dec. 11, 1998

(51) Int. Cl.[7] .............................. B32B 3/00; B32B 3/06; B32B 5/00

(52) U.S. Cl. ................................ 428/307.7; 428/307.3; 428/312.8; 428/315.5; 428/315.7; 428/319.1

(58) Field of Search ........................... 428/307.7, 319.1, 428/307.3, 312.8, 315.5, 315.7

(56) References Cited

U.S. PATENT DOCUMENTS

| | | | | |
|---|---|---|---|---|
| 4,422,005 A | * 12/1983 | Washington et al. | ........ | 313/105 |
| 5,165,991 A | * 11/1992 | Fukuda et al. | ........... | 428/306.6 |
| 5,227,691 A | 7/1993 | Murai et al. | ................ | 313/422 |
| 5,262,198 A | * 11/1993 | Wu et al. | .................... | 427/249 |
| 5,494,858 A | 2/1996 | Gnade et al. | ............... | 437/231 |

(List continued on next page.)

OTHER PUBLICATIONS

Arkles, *Silicon, Germanium, Tin and Lead Compounds, Metal Alkoxides, Diketonates, and Carboxylates, A Survey of Properties and Chemistry* (2d ed.), Gelest, Inc., 1998, pp. 1–544.

Balkenende et al., "High–Voltage Stability Coatings in the Zeus Panel," *Philips J. Res.*, Vol 50, 1996, pp. 407–419.

Brinker et al., "Review of sol–gel thin film formation," *Journal of Non–Crystalline Solids*, vols. 147 and 148, 1992, pp. 424–436.

Brinker et al., *Sol–Gel Science, The Physics and Chemistry of Sol–Gel Processing* (Academic Press), 1990, pp. 787–837.

Brinker et al., "Sol–Gel Thin Film Formation," *J. Cer. Soc. Japan, Cent. Mem. Iss.*, Sandia National Labs., vol. 99, No. 10, 1991, pp. 862–877.

Brinker, "Sol–Gel Derived Thin Films: Critical Issues," Sandia National Laboratories, Nat'l Tech. Info. Serv., 1986, 18 pages.

(List continued on next page.)

*Primary Examiner*—Blaine Copenheaver
*Assistant Examiner*—Leanna Roché
(74) *Attorney, Agent, or Firm*—Skjerven Morrill MacPherson LLP; Ronald J. Meetin

(57) ABSTRACT

A structure that is suitable for partial or full use in a spacer of a flat-panel display. The structure may be formed with a porous body having a face along which multiple primary pores extend into the porous body. A coating consisting primarily of carbon and having a highly uniform thickness overlies the porous body's face, extending along the primary pores to coat their surfaces and converting the primary pores into further pores. The coating can be created by removing non-carbon material from carbon-containing species provided along the pores. A solid porous film whose thickness is normally no more than 20 $\mu$m has a resistivity of $10^8$–$10^{14}$ ohm-cm. A spacer for a flat-panel display contains a support body and an overlying, normally porous, layer whose resistivity is greater parallel to a face of the support body than perpendicular to the body's face.

36 Claims, 13 Drawing Sheets

U.S. PATENT DOCUMENTS

| | | | | | |
|---|---|---|---|---|---|
| 5,523,615 | A | | 6/1996 | Cho et al. | 257/632 |
| 5,541,473 | A | | 7/1996 | Duboc, Jr. et al. | 313/422 |
| 5,548,181 | A | | 8/1996 | Jones | 313/309 |
| 5,561,318 | A | | 10/1996 | Gnade et al. | 257/638 |
| 5,564,959 | A | | 10/1996 | Spindt et al. | 445/24 |
| 5,598,056 | A | | 1/1997 | Jin et al. | 313/495 |
| 5,614,781 | A | * | 3/1997 | Spindt et al. | 313/422 |
| 5,675,212 | A | | 10/1997 | Schmid et al. | 313/422 |
| 5,726,529 | A | | 3/1998 | Dean et al. | 313/495 |
| 5,731,660 | A | | 3/1998 | Jaskie et al. | 313/495 |
| 5,760,538 | A | | 6/1998 | Mitsutake et al. | 313/422 |
| 5,859,502 | A | | 1/1999 | Spindt et al. | 315/169.3 |
| 5,872,424 | A | | 2/1999 | Spindt et al. | 313/495 |
| 5,936,343 | A | | 8/1999 | Fushimi et al. | 313/495 |
| 5,985,067 | A | | 11/1999 | Schmid et al. | 156/89.16 |
| 5,990,614 | A | | 11/1999 | Spindt | 313/495 |
| 6,013,981 | A | * | 1/2000 | Spindt et al. | 313/495 |
| 6,060,832 | A | * | 5/2000 | Adler et al. | 315/5.38 |
| 6,222,313 | B1 | | 4/2001 | Smith et al. | 313/495 |

OTHER PUBLICATIONS

Croitoru et al., "Effect of Composition and Structure Modification of $SnO_x$ Films on the Electron Secondary Emission," *Thin Solid Films*, vol. 116, 1984, pp. 327–339.

Croitoru et al., "Electrical Conductivity, Physical Density and Secondary Electron Emission of Transparent Conductors," *Thin Solid Films*, vol. 125, 1985; pp. 113–117.

Hart, *Organic Chemistry, A Short Course* (6th ed., Houghlin Mifflin Co.), 1983, pp. 15–17.

Hench et al., "The Sol–Gel Process," *Chem. Rev.*, vol. 90, No. 1, 1990, pp. 33–72.

Hoffman, "Inorganic membrane filter for analytical separations," *American Laboratory*, Aug. 1989, pp. 70–73.

Rittenmyer et al., "Piezoelectric 3–3 Composites," *Ferroelectrics*, vol. 41, 1982, pp. 189–195.

Saggio–Woyansky et al., "Processing of Porous Ceramics," *American Ceramics Society Bulletin*, Nov. 1992, pp. 1674–1682.

Seiler, "Secondary Electron Emission," *Electron Beam Interactions With Solids*, 1984, pp. 33–42.

Sherman et al., "Refractory Ceramic Foams: A Novel, New High–Temperature Structure," *Ceramic Bulletin*, vol. 70, No. 6, 1991, pp. 1025–1029.

Thomas, "Optical coatings by the sol–gel process," *Optics News*, Aug. 1986, pp. 18–22.

"Work Function and Secondary Emmission", *AIP Handbook* (3d ed., McGraw–Hill), 1972, pp. 9–183.

* cited by examiner

CONSTITUTION AND FABRICATION OF FLAT-PANEL DISPLAY AND POROUS-FACED STRUCTURE SUITABLE FOR PARTIAL OR FULL USE IN SPACER OF FLAT-PANEL DISPLAY

FIELD OF USE

This invention relates to flat-panel displays of the cathode-ray tube ("CRT") type, including the manufacture of flat-panel CRT displays. This invention also relates to the constitution and fabrication of structures that can be partially or fully utilized in flat-panel CRT displays.

BACKGROUND

A flat-panel CRT display basically consists of an electron-emitting component and a light-emitting component. The electron-emitting component, commonly referred to as a cathode, contains electron-emissive regions that emit electrons over a relatively wide area. The emitted electrons are suitably directed towards light-emissive elements distributed over a corresponding area in the light-emitting component. Upon being struck by the electrons, the light-emissive elements emit light that produces an image on the display's viewing surface.

The electron-emitting and light-emitting components are connected together to form a sealed enclosure normally maintained at a pressure much less than 1 atm. The exterior-to-interior pressure differential across the display is typically in the vicinity of 1 atm. In a flat-panel CRT display of significant viewing area, e.g., at least 10 $cm^2$, the electron-emitting and light-emitting components are normally incapable of resisting the exterior-to-interior pressure differential on their own. Accordingly, a spacer (or support) system is conventionally provided inside the sealed enclosure to prevent air pressure and other external forces from collapsing the display.

The spacer system typically consists of a group of laterally separated spacers positioned so as to not be directly visible on the viewing surface. The presence of the spacer system can adversely affect the flow of electrons through the display. For example, electrons coming from various sources occasionally strike the spacer system, causing it to become electrically charged. The electric potential field in the vicinity of the spacer system changes. The trajectories of electrons emitted by the electron-emitting device are thereby affected, often leading to degradation in the image produced on the viewing surface.

More particularly, electrons that strike a body, such as a spacer system in a flat-panel display, are conventionally referred to as primary electrons. When the body is struck by primary electrons of high energy, e.g., greater than 90 eV, the body normally emits secondary electrons of relatively low energy. More than one secondary electron is, on the average, typically emitted by the body in response to each high-energy primary electron striking the body. Although electrons are often supplied to the body from one or more other sources, the fact that the number of outgoing (secondary) electrons exceeds the number of incoming (primary) electrons commonly results in a net positive charge building up on the body.

It is desirable to reduce the amount of positive charge buildup on a spacer system in a flat-panel CRT display. Jin et al, U.S. Pat. No. 5,598,056, describes one technique for doing so. In Jin et al, each spacer in the display's spacer system is a pillar consisting of multiple layers that extend laterally relative to the electron-emitting and light-emitting components. The layers in each spacer pillar alternate between an electrically insulating layer and an electrically conductive layer. The insulating layers are recessed with respect to the conductive layers so as to form grooves. When secondary electrons are emitted by the spacers in Jin et al, the grooves trap some of the secondary electrons and prevent them from escaping the spacers. Because fewer secondary electrons escape the spacers than what would occur if the grooves were absent, the amount of positive charge buildup on the spacers is reduced.

The technique employed in Jin et al to reduce positive charge buildup is creative. However, the spacers in Jin et al are relatively complex and pose significant concerns in dimensional tolerance and, therefore, in reliability. Manufacturing the spacers in Jin et al could be problemsome. It is desirable to have a relatively simple technique, including a simple spacer design, for reducing charge buildup on a spacer system of a flat-panel CRT display.

GENERAL DISCLOSURE OF THE INVENTION

The present invention furnishes a variety of structures that are porous, at least along a face of each structure. Each of the porous structures, or a portion of each structure, is typically suitable for use in a spacer of a flat-panel CRT display. The present invention also furnishes techniques for manufacturing such porous-faced structures, including methods for manufacturing flat-panel displays.

A porous-faced spacer constituted according to the invention lies between a pair of plate structures of a flat-panel display. An image is supplied by one of the plate structures in response to electrons provided from the other plate structure. Somewhat similar to what occurs in Jin et al, the porosity along the face of the spacer creates facial roughness that prevents some secondary electrons emitted by the spacer from escaping the spacer. Accordingly, positive charge buildup on the spacer is reduced. The image is thereby improved.

In one structure configured according to the invention, multiple particle aggregates are bonded together in an open manner to form a solid porous body in which pores extend between the particle aggregates. The pores inhibit secondary electrons emitted by the porous body from escaping the body. Each particle aggregate contains multiple coated particles bonded together. Each of the coated particles is formed with a support particle and a particle coating that overlies at least part of the support particle.

The particle coatings preferably consist of material which, when struck by high-energy primary electrons, emit fewer secondary electrons than the material that forms the support particles. Candidate materials for the particle coatings are oxides and hydroxides of titanium, vanadium, chromium, manganese, iron, germanium, yttrium, zirconium, niobium, molybdenum, tin, cerium, praseodymium, neodymium, europium, and tungsten, including oxide and/or hydroxide of two or more of these metals. The particle coating material may also contain carbon.

Candidate materials for the support particles include a substantial number of oxides and hydroxides of metals, especially transition metals, and metal-like elements. In particular, the oxides and hydroxides of the non-carbon elements in Groups 3b, 4b, 5b, 6b, 7b, 8, 1b, 2b, 3a, and 4a of Periods 2–6 of the Periodic Table, including the lanthanides, are candidates for the support particles. This includes oxide and/or hydroxide of two or more of these non-carbon elements. As an example, when oxide and/or hydroxide of one or more of aluminum, silicon, titanium, chromium, iron, zirconium, cerium, and neodymium is utilized in the support particles, oxide and/or hydroxide of one or more of titanium, chromium, manganese, iron, zirconium, cerium, and neodymium is typically utilized in the particle coatings. The particle coatings are typically of different chemical composition than the support particles.

Various process sequences can be utilized in accordance with the invention to form a solid porous structure that contains multiple aggregates of coated particles. For instance, starting with (separate) aggregates of support particles, the support-particle aggregates can be bonded together in an open manner to form bonded aggregates of the support particles. Particle coatings are then provided over the support particles in the so-bonded aggregates to form the desired porous structure. Alternatively, the particle coatings can be provided over the support particles before or during the bonding of the support-particle aggregates. As another alternative, the particle coatings can be provided over (separate) support particles before or during particle bonding to form aggregates of the coated particles. The coated particle aggregates are then bonded together to form the desired solid porous structure.

When a porous-faced spacer of the present flat-panel display utilizes part or all of a porous structure containing multiple aggregates of particles bonded together in an open manner to form pores, the particles may include uncoated particles. That is, each of the particles need not have a particle coating that overlies a generally distinct, typically earlier formed, support particle.

In another structure configured according to the invention, a porous body has a face along which multiple primary pores extend into the body. A coating overlies a face of the porous body and extends along the primary pores so as to coat their surfaces without substantially closing them. The resulting pores in the combination of the porous body and the coating are referred to here as further pores. The coating normally consists principally of carbon. The carbon-containing coating typically has a thickness of 1–100 nm when the average diameter of the primary pores is 5–1,000 nm. Since the further pores are carbon-coated versions of the primary pores, the average diameter of the further pores is less than that of the primary pores and can be as little as 1 nm.

The thickness of the carbon-containing coating is normally highly uniform, especially along the pores. Specifically, the standard deviation in the thickness of the coating is preferably no more than 20%, more preferably no more than 10%, of the average thickness of the coating.

When the structure that contains the present carbon-containing coating is employed in a spacer of a flat-panel CRT display, the carbon in the coating normally emits fewer secondary electrons than what would occur from the underlying material of the porous body if the coating were absent. Making the coating thickness highly uniform enables the coating to be made quite thin without significantly exposing the underlying porous body and thereby increasing the secondary electron emission. The spacer normally dissipates less power as the coating is made thinner. Hence, achieving the present coating thickness uniformity leads, advantageously, to a reduction in power dissipation while avoiding an increase in secondary electron emission and an attendant increase in positive charge buildup on the spacer.

One technique for making a carbon-coated porous body according to the invention begins with precursor material that has multiple carbon-containing, normally organic, groups. A porous body is formed from the precursor material according to a process in which molecules of the precursor material cross-link while retaining at least part of the carbon-containing groups. When the precursor material is part of a liquidous composition, the ends of the carbon-containing groups typically move into the liquid so that the retained carbon-containing groups coat the surfaces of pores in the body.

The porous body is subsequently treated to remove non-carbon constituents of the retained carbon-containing groups, at least along exposed surface of the porous body. This may entail pyrolizing the retained carbon-containing groups or/and subjecting them to phenomena such as a plasma, an electron beam, ultraviolet light, or a reducing environment. In any event, the treating step furnishes the porous body with a rough face constituted principally with carbon.

Another technique for making a carbon-coated porous body in accordance with the invention begins with a porous body having a porosity of at least 10% along a rough face of the body. The porous body is subjected to carbon-containing chain molecules, each having at least one leaving species and at least one carbon-containing chain. The carbon-containing chain molecules chemically bond to the porous body, largely by reactions that involve only the leaving species. At least one leaving species is normally released from each carbon-containing chain molecule as it bonds to the porous body. Non-carbon constituents are subsequently removed from the so-bonded chain molecules. The porous body is thereby furnished with a carbon-containing coating.

In a further structure configured according to the invention, a solid porous film consists principally of oxide and/or hydroxide. Candidates for the oxide and/or hydroxide are oxides and/or hydroxides of non-carbon elements in Groups 3b, 4b, 5b, 6b, 7b, 8, 1b, 2b, 3a, and 4a of Periods 2–6 of the Periodic Table, again including the lanthanides. Preferably, the oxide and/or hydroxide includes oxide and/or hydroxide of one or more of silicon, titanium, vanadium, chromium, manganese, iron, germanium, yttrium, zirconium, niobium, molybdenum, tin, cerium, praseodymium, neodymium, europium, and tungsten, including oxide and/or hydroxide of two or more of these elements. The porous film has a porosity of at least 10% along a face of the film and an average thickness of no more than 20 $\mu$m. The average electrical resistivity of the film is $10^8$–$10^{14}$ ohm-cm, preferably $10^9$–$10^{13}$ ohm-cm, at 25° C.

A porous film that contains oxide and/or hydroxide is typically created by initially forming a liquid-containing film that includes precursor material of the oxide and/or hydroxide. The precursor material may be polymeric in nature and/or may consist of particles. The liquid-containing film is then processed to remove liquid from the film and convert it into a solid porous film having the porosity, thickness, and electrical resistivity properties specified above.

The film processing is normally conducted in such a way that atoms of the precursor material bond to one another in forming the solid porous film. Gas evolution from the precursor material and/or the liquid may be employed to create or enhance the solid film's porosity. Also, the precursor material may include sacrificial carbon-containing, normally organic, material. After creating a solid film from the liquid-containing film, porosity is produced or enhanced in the solid film by removing non-carbon material, and typically also carbon, of the sacrificial part of the precursor material. A generally conformal coating may be provided over the solid porous film.

Each of the foregoing structures is, as mentioned above, utilized partially or wholly in a porous-faced spacer of a flat-panel display configured according to the invention. The porous-faced spacer lies between a first plate structure and an oppositely situated second plate structure. The first plate structure emits electrons. The second plate structure emits light upon receiving electrons emitted by the first plate structure.

Some high-energy primary electrons usually strike the spacer during display operation, causing the spacer to emit secondary electrons. The so-emitted secondary electrons are, on the average, normally of significantly lower energy than the primary electrons. Due to the porosity-produced roughness in the spacer's face, the lower-energy secondary electrons are more prone to impact the spacer and be captured by it than what would occur if the spacer's face were smooth. The lower-energy secondary electrons captured by the spacer cause relatively little further secondary electron emission from the spacer. The porosity along the spacer's face thereby causes the overall amount of secondary electron emission to be reduced.

Primary electrons which strike the spacer include electrons that follow trajectories directly from the first plate structure to the spacer as well as electrons that reflect off the second plate structure after having traveled from the first plate structure to the second plate structure. The reflected electrons are generally referred to as "backscattered" electrons. While the flat-panel display can normally be controlled so that only a small fraction of the electrons emitted by the first plate structure directly strike the spacer, the backscattered electrons travel in a broad distribution of directions as they leave the second plate structure. As a result, electron backscattering off the second plate structure is difficult to control direction-wise. By inhibiting secondary electrons emitted by the present spacer from escaping the spacer, the spacer facial porosity also reduces spacer charging that would otherwise result from backscattered primary electrons striking the spacer.

In another aspect of the invention, a spacer situated between a pair of plate structures of a flat-panel display that operates in the preceding manner is provided with a directional resistivity characteristic for enhancing display performance. For this purpose, a substantially unitary primary layer overlies a face of a support body of the spacer. The spacer's primary layer, although unitary in nature, is normally porous. The primary layer has a higher electrical resistivity parallel to the face of the support body than perpendicular to the support body's face. More particularly, the average resistivity of the layer parallel to the body's face is typically at least twice, preferably at least ten times, the average resistivity of the layer perpendicular to the body's face.

By providing the spacer with the foregoing directional resistivity characteristic, the relatively low resistivity perpendicular to the face of the spacer's support body enables charge that accumulates on the spacer due to primary electrons striking the spacer to be rapidly transferred from the outside of the spacer through the coating to the support body and then removed from the spacer. On the other hand, the relatively high resistivity parallel to the support body's face serves to limit the current that flows through the primary layer from either plate structure to the other plate structure. Power dissipation is reduced. The display can operate efficiently without incurring significant charge buildup on the spacer. Also, the functions of controlling charge buildup and handling current flow from one plate structure to the other are substantially decoupled, thereby facilitating spacer design.

The primary layer of the spacer typically includes a base layer and a plurality of resistivity-modifying regions. The base layer overlies the face of the support body. The resistivity-modifying regions occupy laterally separated sites laterally surrounded by the base layer. The resistivity-modifying regions, preferably formed with carbon, are of lower average resistivity than the base layer. As a result, the resistivity of the primary layer is higher parallel to the support body's face than perpendicular to the body's face.

In accordance with the invention, a primary layer with a directional resistivity characteristic is typically created by initially forming a liquid-containing body that includes carbon particles and precursor material. The liquid-containing body is then processed to remove liquid from the body and convert it into a porous body through which most of the carbon particles largely penetrate. Atoms of the precursor material, which may be polymeric and/or consist of particles, normally bond to one another in forming the porous body. The porous body then constitutes a base layer of the primary layer, while the carbon particles constitute resistivity-modifying regions.

To the extent that the spacer used in the present flat-panel display has multiple levels of spacer material, the levels typically extend vertically relative to the electron-emitting and light-emitting components rather than laterally as in Jin et al. A spacer with vertically extending spacer-material levels is generally simpler in design, and can be fabricated to high tolerances more easily, than a spacer having laterally extending spacer-material levels. When the present spacer has multiple vertically extending levels of spacer material, reliability concerns associated with the spacer design are considerably less severe than those that arise with the spacer design of Jin et al. When the spacer used in the present display has only a single level of spacer material, the display essentially avoids the reliability concerns that arise in Jin et al. The net result is a large advance over the prior art.

Figure 1:
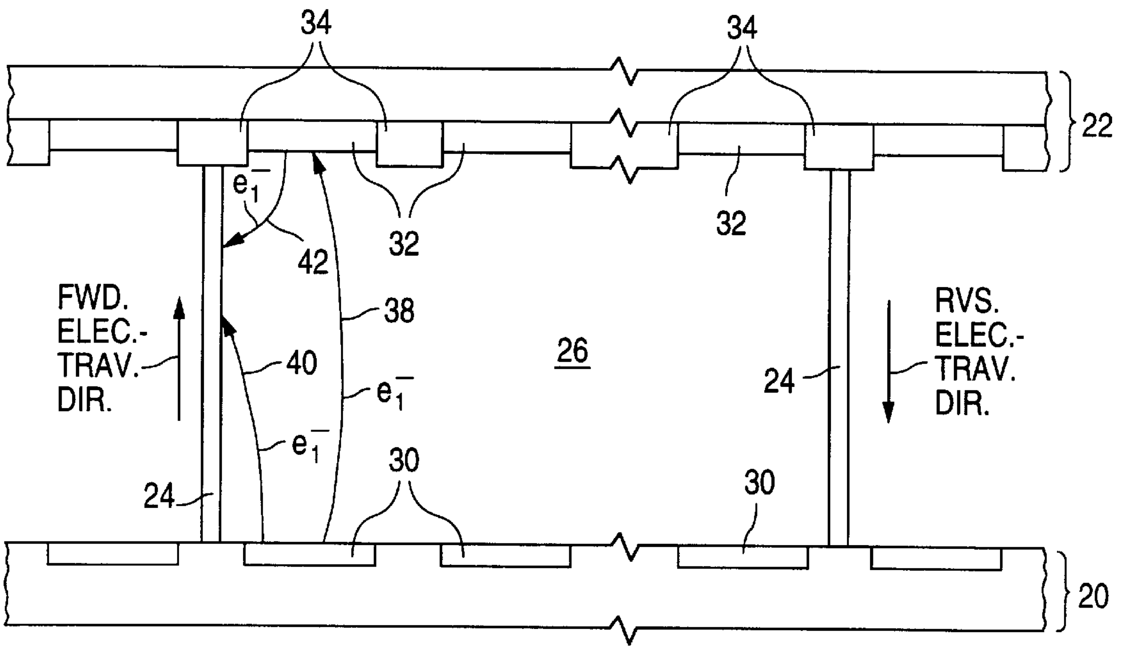
FIG. 1 is a general cross-sectional side view of a flat-panel CRT display having a spacer system configured according to the invention.

The symbol "$e_1^-$" in the drawings represents a primary electron. The symbol "$e_2^-$" in the drawings represents a secondary electron.

Like reference symbols are employed in the drawings and in the description of the preferred embodiments to represent the same, or very similar, item or items.

DESCRIPTION OF THE PREFERRED EMBODIMENTS

General Display Configuration

An internal spacer system for a flat-panel CRT display configured and fabricated according to the invention is formed with spacers that are porous along their faces for reducing spacer charging during display operation. Primary electron emission in the present flat-panel CRT display typically occurs according to field-emission principles. A field-emission flat-panel CRT display (often referred to as a field-emission display) having a spacer system configured according to the invention can serve as a flat-panel television or a flat-panel video monitor for a personal computer, a lap-top computer, or a workstation.

In the following description, the term "electrically insulating" (or "dielectric") generally applies to materials having an electrical resistivity greater than $10^{12}$ ohm-cm at 25° C. The term "electrically non-insulating" thus refers to materials having an electrical resistivity of up to $10^{12}$ ohm-cm at 25° C. Electrically non-insulating materials are divided into (a) electrically conductive materials for which the electrical resistivity is less than 1 ohm-cm at 25° C. and (b) electrically resistive materials for which the electrical resistivity is in the range of 1 ohm-cm to $10^{12}$ ohm-cm at 25° C. Similarly, the term "electrically non-conductive" refers to materials having an electrical resistivity of at least 1 ohm-cm at 25° C., and includes electrically resistive and electrically insulating materials. These categories are determined at an electric field of no more than 10 volts/μm.

FIG. 1 illustrates a field-emission display ("FED") configured in accordance with the invention. The FED of FIG. 1 contains an electron-emitting backplate structure 20, a light-emitting faceplate structure 22, and a spacer system situated between plate structures 20 and 22. The spacer system resists external forces exerted on the display and maintains a largely constant spacing between structures 20 and 22.

In the FED of FIG. 1, the spacer system consists of a group of laterally separated largely identical spacers 24 generally shaped as relatively flat walls. Each of spacer walls 24 is porous at least along its opposing faces. FIG. 1 is presented at too large a scale to conveniently depict the facial roughness that results from the porous nature of spacer walls 24. The spacer wall facial roughness is pictorially illustrated in certain of the later drawings, starting with FIG. 2. Returning to FIG. 1, each spacer wall 24 extends generally perpendicular to the plane of the figure. Plate structures 20 and 22 are connected together through an annular peripheral outer wall (not shown) to form a high-vacuum sealed enclosure 26 in which spacer walls 24 are situated.

Backplate structure 20 contains an array of rows and columns of laterally separated electron-emissive regions 30 that face enclosure 26. Electron-emissive regions 30 overlie an electrically insulating backplate (not separately shown) of plate structure 20. Each electron-emissive region 30 normally consists of a large number of electron-emissive elements shaped in various ways such as cones, filaments, or randomly shaped particles. Plate structure 20 also includes a system (also not separately shown) for focusing electrons emitted by regions 30.

FIG. 1 depicts a column of electron-emissive regions 30. The row direction extends into the plane of FIG. 1. Each spacer wall 24 contacts backplate structure 20 between a pair of rows of regions 30. Each consecutive pair of walls 24 is separated by multiple rows of regions 30.

Faceplate structure 22 contains an array of rows and columns of laterally separated light-emissive elements 32 formed with light-emissive material such as phosphor. Light-emissive elements 32 overlie a transparent electrically insulating faceplate (not separately shown) of plate structure 22. Each electron-emissive element 32 is situated directly opposite a corresponding one of electron-emissive regions 30. The light emitted by elements 32 forms an image on the display's viewing surface at the exterior surface of faceplate structure 22.

The FED of FIG. 1 may be a black-and-white or color display. Each light-emissive element 32 and corresponding electron-emissive region 30 form a pixel in the black-and-white case, and a sub-pixel in the color case. A color pixel typically consists of three sub-pixels, one for red, another for green, and a third for blue.

A border region 34 of dark, typically black material laterally surrounds each of light-emissive elements 32 above the faceplate. Border region 34, referred to here as a black matrix, is typically raised relative to light-emissive elements 32. In view of this and to assist in pictorially distinguishing elements 32 from black matrix 34, FIG. 1 illustrates black matrix 34 as extending further towards backplate structure

20 than do elements 32. Compared to elements 32, black matrix 34 is substantially non-emissive of light when struck by electrons emitted from regions 30 in backplate structure 20.

In addition to components 32 and 34, faceplate structure 22 contains an anode (not separately shown) situated over or under components 32 and 34. During display operation, the anode is furnished with a potential that attracts electrons to light-emissive elements 32.

During FED operation, electron-emissive regions 30 are controlled to emit primary electrons that selectively move toward faceplate structure 22. The electrons so emitted by each region 30 preferably strike corresponding target light-emissive element 32, causing it to emit light. Item 38 in FIG. 1 represents the trajectory of a typical primary electron traveling from one of regions 30 to corresponding element 32. The forward electron-travel direction is thus from backplate structure 20 to faceplate structure 22 generally parallel to spacer walls 24 and thus generally perpendicular to plate structure 20 or 22.

Some of the primary electrons emitted by each region 30 invariably strike parts of the display other than corresponding target light-emissive element 32. To the extent that the emitted primary electrons are off-target, the control provided by the electron-focusing system and any other electron trajectory-control components of the FED display is normally of such a nature that the large majority of the off-target primary electrons strike black matrix 34. However, off-target primary electrons occasionally follow trajectories directly from an electron-emissive element 30 to nearest spacer wall 24 as represented by electron trajectory 40 in FIG. 1. Such off-target primary electrons that strike spacer walls 24 are often of sufficiently high energy to cause walls 24 to emit secondary electrons.

Also, some of the primary electrons that travel from an electron-emissive region 30 to faceplate structure 22 are scattered backward off plate structure 22 rather than causing light emission. The reverse electron-travel direction is from faceplate structure 22 to backplate structure 20 generally parallel to spacer walls 24. While the FED is normally controlled so that the vast majority of primary electrons emitted by each region 30 impact directly on or close to its target light-emissive element 32, electrons scattered backward off faceplate structure 22 move initially in a broad distribution of directions. A substantial fraction of the backscattered electrons strike spacer walls 24. Item 42 in FIG. 1 represents the trajectory of a backscattered primary electron as it travels from a light-emissive element 32 to nearest spacer wall 24. Backscattered primary electrons that strike spacer walls 24 are normally of sufficiently high energy to cause walls 24 to emit secondary electrons. Some of the backscattered electrons return to faceplate structure 22 and cause light emission or are further backscattered.

Figure 2:
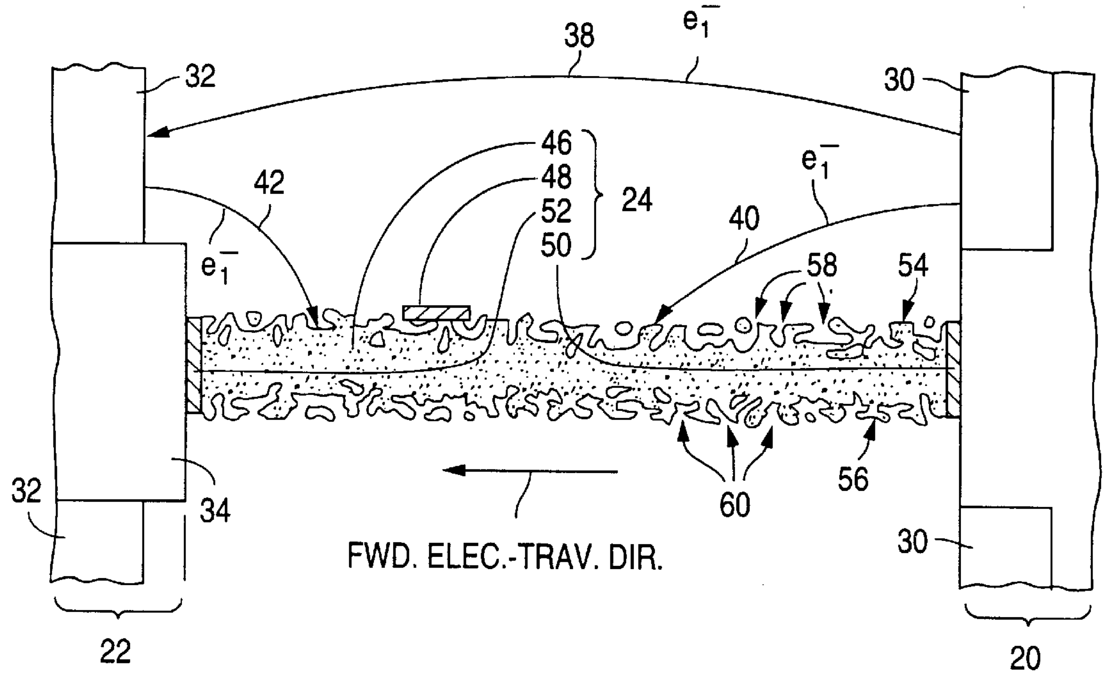
FIG. 2 is an exploded cross-sectional view of a portion of the flat-panel display of FIG. 1 centered around one of the wall-shaped spacers in the spacer system.

FIG. 2 presents an exploded view of one spacer wall 24, including adjoining portions of plate structures 20 and 22. The cross section of FIG. 2 is rotated 90° counter-clockwise to that of FIG. 1. With reference to FIG. 2, each spacer wall 24 consists of a rough-faced generally wall-shaped electrically non-conductive main spacer body 46 and one or more adjoining electrically non-insulating spacer wall electrodes represented here as electrodes 48, 50, and 52. Although FIG. 2 illustrates main spacer wall 46 as fully underlying spacer electrodes 48, 50, and 52, one or more thin portions of main wall 46 may partially or fully overlie one or more of electrodes 48, 50, and 52.

Main wall 46 has a pair of opposing rough faces 54 and 56. The roughness in main wall faces 54 and 56 arises from pores 58 and 60 that extend into wall 46 respectively along wall faces 54 and 56. Some of the primary electrons that strike a spacer wall 24 occasionally hit electrodes 48, 50, and 52, primarily electrode 48. However, as represented in FIG. 2 where electron trajectories 40 and 42 terminate on rough face 54, the large majority of these primary electrons strike face 54 or 56.

Spacer wall electrodes 48, 50, and 52 preferably consist of electrically conductive material, typically metal such as aluminum, chromium, nickel, or gold, including a metallic alloy such as a nickel-vanadium alloy, or a combination of two or more of these metals. In any event, electrodes 48, 50, and 52 are of considerably lower average electrical resistivity than main wall 46. Electrode 48 is a face electrode situated on wall face 54. Another such face electrode (not shown) may be situated on wall face 56 opposite face electrode 48. Electrodes 50 and 52 are end (or edge) electrodes situated on opposite ends (or edges) of main wall 46 so as to respectively contact plate structures 20 and 22.

Wall electrodes 48, 50, and 52 cooperate with the electron-focusing system in controlling the movement of electrons from backplate structure 20 through sealed enclosure 26 to faceplate structure 22. Further examples of how spacer wall electrodes, such as electrodes 48, 50, and 52, function to control the forward electron movement are presented in Spindt et al, U.S. patent application Ser. No. 09/008,129, filed Jan. 16, 1998, now U.S. Pat. No. 6,049,165 and Spindt et al U.S. patent application Ser. No. 09/053,247, filed Mar. 31, 1998, now U.S. Pat. No. 6,107,731. The contents of Ser. Nos. 09/008,129 and 09/053,247 are incorporated by reference herein. Alternative implementations for electrodes 48, 50, and 52 are also presented in Ser. Nos. 09/008,129 and 09/053,247.

Pore Characteristics

Pores 58 and 60 in main spacer wall 46 are normally of irregular shape. Many of pores 58 intersect one another below an imaginary plane running along the top of rough wall face 54. Some of pores 58 do not reach face 54, i.e., they lie fully below the imaginary plane running along the top of face 54. The same applies to pores 60 with respect to an imaginary plane running along the top (bottom in the orientation of FIG. 2) of rough wall face 56.

Pores 58 and 60 are normally distributed in a generally random manner in main wall 46. As discussed further below, pores 58 and 60 are normally present in a pair of thin layers along rough faces 54 and 56. However, in some embodiments, pores 58 and 60 can be distributed largely throughout wall 46. Pores 58 are typically present along largely all of face 54. Likewise, pores 60 are typically present along largely all of face 56. Pores 58 and 60 are normally similar to irregular pores in a sponge.

The term "porosity" is employed here in characterizing rough faces 54 and 56 of main wall 46. The volume porosity of a porous body is the percentage of the body's volume occupied by the pores or/and other such openings in the porous body. The porosity of main wall 46 along face 54 or 56, variously referred to here as the main wall facial porosity or the main wall porosity along face 54 or 56, is therefore the percentage of area occupied by pores 58 or 60 along an imaginary plane running generally through face 54 or 56 along or near the tops of pores 58 or 60.

Main wall 46 normally has a porosity of at least 10% along each of wall faces 54 and 56. The main wall porosity along face 54 or 56 is preferably at least 20%, more preferably at least 40%. The main wall facial porosity is typically 60% or more, often up to 80% or more. In some embodiments, the main wall porosity along face 54 or 56 can reach 90% or more.

Pores 58 and 60 normally have an average pore diameter in the range of 1–1,000 nm. The average pore diameter is typically 5–1,000 nm, preferably 10–500 nm, more preferably 25–250 nm.

Effect of Facial Porosity on Electron Escape

Figure 3:
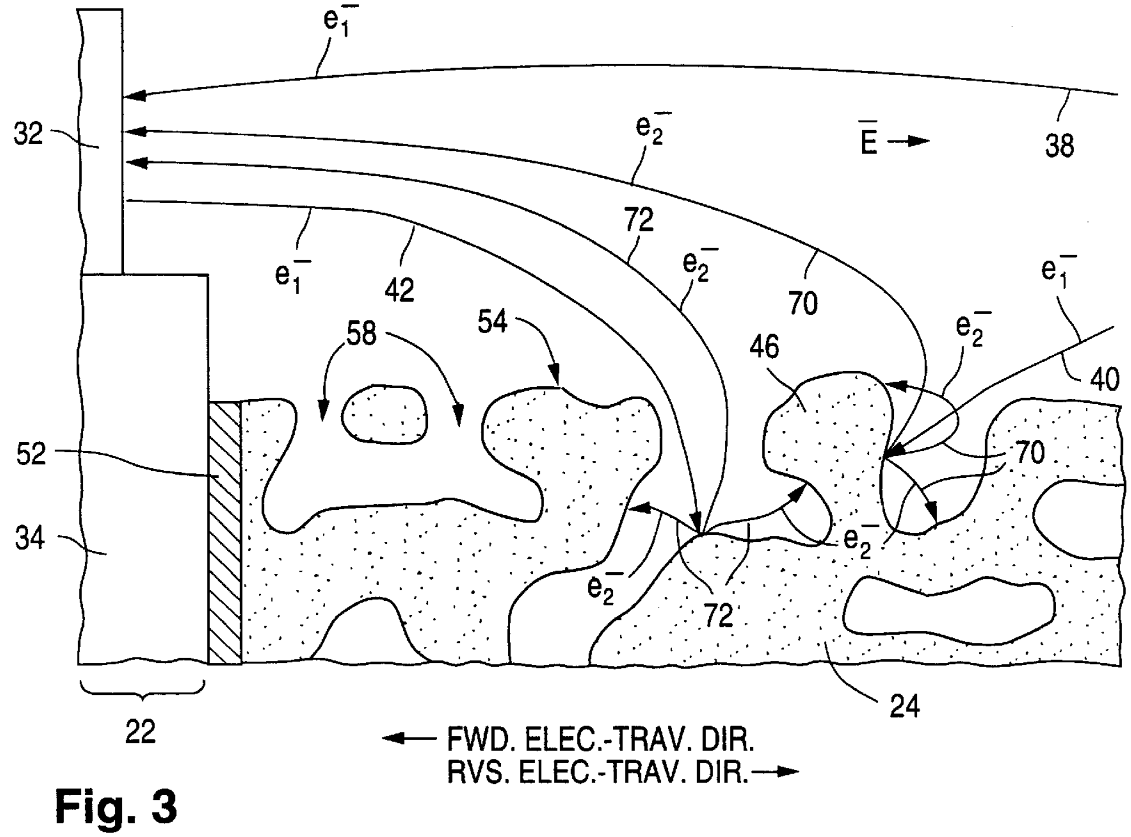
FIG. 3 is a cross-sectional view of a section of the display portion in FIG. 2.
Figure 4:
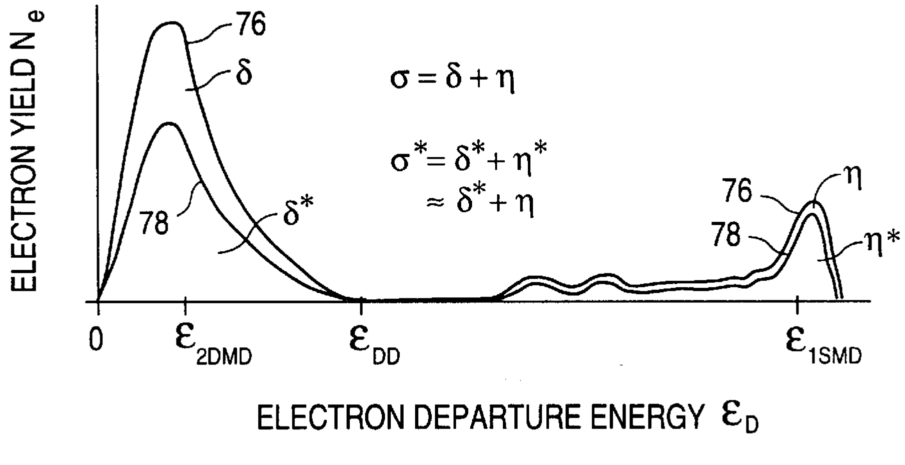
FIG. 4 is a general graph of electron yield as a function of electron departure energy, largely secondary-electron departure energy, for a spacer wall in the spacer system of the flat-panel display in FIG. 1.

An understanding of how the porosity-produced roughness in wall faces 54 and 56 reduces the fraction, and normally the number, of secondary electrons that escape main wall 46 is facilitated with the assistance of FIGS. 3 and 4. FIG. 3 depicts a portion of spacer wall 24 along rough face 54 and an adjoining portion of faceplate structure 22. FIG. 4 illustrates how the number of electrons that escape a surface upon being struck by high-energy primary electrons of median striking (incident) energy $\epsilon_{1SMD}$ varies with the energy $\epsilon_D$ of the escaping electrons just as they depart from the surface. The number of electrons that escape a unit area of a smooth surface, or a projected unit area of a rough surface, at any value of electron departure energy $\epsilon_D$ is the electron yield $N_e$. The vast majority of electrons that escape such a surface are secondary elections. Consequently, energy $\epsilon_D$ is largely the departure energy of escaping secondary electrons.

Referring to FIG. 3, secondary electrons are emitted by main wall 46 upon being struck by high-energy primary electrons traveling directly from backplate structure 20, as represented by electron trajectory 40, and by high-energy primary electrons backscattered off faceplate structure 22, as represented by electron trajectory 42, after traveling from backplate structure 20 to faceplate structure 22. In FIG. 3, primary electron trajectories 40 and 42 respectively terminate in a pair of pores 58 along wall face 54.

Items 70 in FIG. 3 indicate examples of trajectories followed by secondary electrons emitted from a point in one pore 58 when main wall 46 is struck by a primary electron that follows trajectory 40 to that point. Items 72 indicate examples of trajectories followed by secondary electrons emitted from a point in another pore 58 when wall 46 is struck by a primary electron following trajectory 42 to the second point. As indicated by multiple secondary electron trajectories 70 or 72 for each primary electron trajectory 40 or 42, the number of secondary electrons caused by each primary electron typically averages more than one.

An electric field $\overline{E}$ is directed generally from faceplate structure 22 to backplate structure 20. Electric field $\overline{E}$ is the principal force that acts on secondary electrons emitted by main wall 46. To a first approximation, trajectories 70 and 72 followed by the secondary electrons are roughly parabolic, at least in the immediate vicinity of wall 46. Since electrons are negatively charged, trajectories 70 and 72 bend towards faceplate structure 22 as electric field $\overline{E}$ causes the secondary electrons to be accelerated towards faceplate structure 22.

The initial directions of secondary electrons that follow trajectories such as trajectories 70 and 72 are largely random. Some of the secondary electrons rapidly strike other points in pores 58 from which they were emitted. Other secondary electrons strike points in pores 58 from which they were emitted after their trajectories 70 or/and 72 bend significantly towards faceplate structure 22. Yet other secondary electrons escape spacer wall 24 and follow trajectories 70 and 72 towards faceplate structure 22.

A large majority of the electrons that return to main wall 46 impact wall 46 close to where they were emitted from wall 46 and therefore are of relatively low energy at impact. Consequently, these secondary electrons are largely captured by wall 46. Because their energy is relatively low at impact, they also do not cause significant further secondary electron emission from wall 46.

Whether a secondary electron is captured by, or escapes from, main wall 46 depends on a number of factors, including (a) the secondary electron's emission departure direction, (b) departure energy $\epsilon_{2D}$ and thus the departure speed of the secondary electron, (c) where the primary electron strikes wall face 54 and therefore where the secondary electron is emitted from face 54, (d) the characteristics of pores 58 along face 54, and (e) the average magnitude of electric field $\overline{E}$ between plate structures 20 and 22.

Pores 58 along face 54 tend to trap secondary electrons by providing them with surfaces to hit and thereby be captured. Since a secondary electron is emitted from largely the point at which a primary electron strikes face 54, the average probability of capturing a secondary electron emitted from a recessed area along face 54 normally increases as the emission-causing primary electron penetrates deeper into a pore 58. The so-emitted secondary electron has increased distance to travel and, on the average, greater likelihood of traveling in an initial direction which results in the electron striking a point in that pore 58 than a secondary electron emitted from a shallower point in that pore 58. In contrast, secondary electrons emitted from high points on face 54 have few places to contact face 54 and have low probabilities of being captured by face 54.

If a completely smooth face were substituted for rough face 54, there would be no recessed areas for secondary electrons to strike. A very high fraction of the secondary electrons emitted by the body having the smooth face would escape the body. Hence, pores 58 and 60 cause the fraction of emitted secondary electrons that escape main wall 46 to be less than the fraction of emitted secondary electrons that escape the smooth reference surface.

On the other hand, roughness in a surface appears to cause the number of secondary electrons to increase, at least for certain types of surface roughness. The increase in the number of secondary electrons emitted from such a rough surface varies with the energies of the primary electrons as they strike the rough surface and typically increases with increasing primary electron striking energy $\epsilon_{1SMD}$ greater than approximately 1,000 eV. Whether the roughness in the surface leads to an increase or decrease in the total number of secondary electrons that actually escape the rough surface thus depends on the magnitudes of the incident energies of the primary electrons. In the FED that contains spacer wall 24, the primary electrons strike wall face 54 or 56 with energies which, although high compared to median secondary-electron departure energy $\epsilon_{2DMD}$, are sufficiently low that the roughness produced by pores 58 and 60 causes a reduction in the total number of secondary electrons that escape main wall 46 and, accordingly, that escape spacer wall 24.

Electric field $\overline{E}$ causes backscattered primary electrons moving away from faceplate structure 22 to slow down. More specifically, the backscattered electrons lose velocity in the reverse electron-travel direction. To a first approximation, the backscattered electrons maintain the components of their velocity parallel to plate structure 22 or 20. As a result, the backscattered electrons are more likely to penetrate deeper into pores 58 along wall face 54 than electrons traveling directly from backplate structure 20 to main wall 46. Due to the deeper penetration of the backscattered primary electrons into pores 58, the resulting secondary electrons emitted by wall 46 are more prone to be captured by wall 46 than the secondary electrons caused by primary electrons traveling directly from backplate structure 20 to wall 46. The porosity-produced roughness in wall faces 54 and 56 thereby especially reduces positive spacer charging due to electron backscattering off faceplate structure 22.

Two curves 76 and 78 are shown in FIG. 4. Curve 76 represents the yield $N_e$ of electrons which escape a unit area of a flat smooth reference surface formed with material of the same chemical composition as the material that forms rough wall face 54 while high-energy primary electrons of median striking energy $\epsilon_{1SMD}$ impact the smooth reference surface. This yield, referred to here as the "natural" electron yield, is normally determined for primary electrons that impinge perpendicularly on the reference surface. Curve 78 represents the yield $N_e$ of electrons that escape rough face 54 along a projected unit area of face 54, i.e., along a unit area of an imaginary plane running through the top of face 54, while high-energy primary electrons of median striking energy $\epsilon_{1SMD}$ impact face 54. The electron yield represented by curve 78 is referred to here as the "roughness-modified" electron yield.

The secondary electrons emitted by rough face 54 or the reference surface upon being struck by primary electrons of median striking energy $\epsilon_{1SMD}$ have a median energy $\epsilon_{2DMD}$ as they are emitted from, and therefore start to depart from, face 54 or the reference surface. Energy $\epsilon_{2DMD}$ is referred to here as the median secondary-electron departure energy.

Each of curves 76 and 78 has two peaked portions as a function of electron departure energy $\epsilon_D$: a low-energy left-hand peak and a high-energy right-hand peak. In some cases, the left-hand peaks of curves 76 and 78 occur at, or essentially at, the vertical axis where departure energy $\epsilon_D$ is zero. The left-hand peak of each of curves 76 and 78 tails off relatively slowly with increasing electron departure energy $\epsilon_D$. The end of the tail of each of the left-hand peaks occurs approximately at a dividing electron energy $\epsilon_{DD}$ between median secondary-electron departure energy $\epsilon_{2DMD}$ and primary-electron striking energy $\epsilon_{1SMD}$. The right-hand peaks of curves 76 and 78 are much closer to each other than the left-hand peaks are to each other.

The low-energy left-hand peak of curve 76 largely represents the yield of secondary electrons that are emitted by, and escape from, the smooth reference surface as a function of electron departure energy $\epsilon_D$. Integration of the left-hand peak of curve 76 from zero to dividing energy $\epsilon_{DD}$ largely gives the total natural secondary electron yield, i.e., the total number of electrons that escape a unit area of the reference surface. The ratio of the total natural secondary-electron yield to the total number of primary electrons that strike a unit area of the reference surface is the natural secondary electron yield coefficient δ.

The low-energy left-hand peak of curve 78 largely represents the yield of secondary electrons that actually escape main wall 46 along rough face 54. Since some of the secondary electrons emitted from face 54 are subsequently captured by face 54 due to the spacer facial porosity, the left-hand peak of curve 78 is largely the difference, per projected unit area of face 54, between the number of secondary emitted by face 54 and the number of secondary electrons captured by face 54 as a function of electron departure energy $\epsilon_D$. The left-hand peak of curve 78 is lower than the left-hand peak of curve 76 because primary electrons strike both (a) face 54 in the present FED and (b) the smooth reference surface with median primary-electron striking energy $\epsilon_{1SMD}$ which, while generally high, is sufficiently low that the total number of secondary electrons which escape face 54 is less than the total number of secondary electrons which escape the reference surface.

Integration of the left-hand peak of curve 78 from zero to dividing energy $\epsilon_{DD}$ largely gives the total roughness-modified secondary electron yield. The ratio of the total roughness-modified secondary electron yield to the total number of primary electrons that pass through a projected unit area of face 54 is the roughness-modified secondary electron yield coefficient δ*. Since (a) face 54 captures some of the emitted secondary electrons and (b) primary-electron striking energy $\epsilon_{1SMD}$ is sufficiently low in the present FED, roughness-modified secondary electron yield coefficient δ* of face 54 is less than natural secondary electron yield coefficient δ of the (type of) material that forms face 54.

Some of the high-energy primary electrons that strike rough face 54 or the smooth reference surface are reflected, or scattered, rather than causing secondary electron emission. The high-energy right-hand peaks of curves 76 and 78 largely represent primary electrons that scatter off face 54 or the reference surface and escape face 54 or the reference surface. Some of the primary electrons scattered off face 54 strike face 54 elsewhere, largely due to the spacer facial roughness, and cause secondary electron emission there. The effect of primary electrons that scatter off face 54 but do not escape face 54 is included within the roughness-modified secondary electron yield. Because secondary electrons emitted from face 54 are of lower departure energy $\epsilon_D$ than primary electrons scattered off face 54, the fraction of secondary electrons captured by face 54 is normally considerably greater than the fraction of scattered primary electrons captured by face 54.

Electrons are emitted from rough face 54 or the smooth reference surface due to phenomena other than high-energy primary electrons striking face 54 or the reference surface. In FIG. 4, the number of electrons that escape face 54 or the reference surface as a result of other such phenomena is represented largely by the relatively low-level curve portion between the left-hand and right-hand peaks of corresponding curve 78 or 76.

Integration of curve 76 from dividing energy $\epsilon_{DD}$ to the right-hand edge of the right-hand peak gives the total natural non-secondary electron yield, i.e., the total number of scattered primary electrons and other non-secondary electrons that escape a unit area of the reference surface. The ratio of the total natural non-secondary electron yield to the total number of primary electrons that strike a unit area of reference surface is the natural non-secondary electron yield coefficient η. Similarly, integration of curve 78 from dividing energy $\epsilon_{DD}$ to the right-hand end of the right-hand peak gives the total roughness-modified non-secondary electron yield. The ratio of the total roughness-modified non-secondary electron yield to the total number of electrons that pass through a projected unit area of face 54 is the roughness-modified non-secondary electron yield coefficient η*.

Curves 76 and 78 are quite close to each other over the integration range above dividing energy $\epsilon_{DD}$, curve 78 typically being no greater than curve 76 over this range. Hence, roughness-modified non-secondary electron yield coefficient η* is close to natural non-secondary electron yield coefficient η and, in any event, is no more than coefficient η.

The sum of natural secondary electron yield coefficient δ and natural non-secondary electron yield coefficient η is the total natural electron yield coefficient σ for the reference surface. Likewise, the sum of roughness-modified secondary electron yield coefficient δ* and roughness-modified non-secondary electron yield coefficient η* is the total roughness-modified electron yield coefficient δ* for rough face 54. As mentioned above, coefficient δ* is less than coefficient δ at the magnitude of median primary-electron striking energy $\epsilon_{1SMD}$ typically present in the FED of the invention. Since coefficient $\eta^*$ is no more than coefficient $\eta$, total roughness-modified electron yield coefficient $\sigma^*$ of face 54 is less than natural electron yield coefficient $\sigma$ of the material that forms face 54 at the $\epsilon_{1SMD}$ magnitude which typically occurs in the present FED.

Natural coefficients $\sigma$, $\delta$, and $\eta$, although determined for a smooth surface at specific primary electron impingement conditions (i.e., normal to the smooth surface), are generally considered to be properties of the material that forms the smooth surface. In the present situation, coefficients $\sigma$, $\delta$, and $\eta$ are properties of the material that forms wall face 54 without regard to the roughness in face 54.

Electrical Characteristics, Constituency, and Internal Configuration of Main Spacer Body Main wall-shaped spacer body 46 normally has a sheet resistance of $10^8$–$10^{16}$ ohms/sq. The sheet resistance of main wall 46 is preferably $10^{10}$–$10^{14}$ ohms/sq., typically $10^{11}$–$10^{12}$ ohms/sq. Wall 46 normally has a breakdown voltage of at least 1 volt/$\mu$m. The wall breakdown voltage is preferably greater than 4 volts/$\mu$m, typically greater than 6 volts/$\mu$m.

Main wall 46 may be internally configured in various ways. FIGS. 5*a*–5*d* illustrate four basic internal configurations for main wall 46. Each functionally different layer or coating in each configuration of FIGS. 5*a*–5*d* may consist of two or more layers or coatings that provide the indicated function. Wall 46 may also include one or more layers or coatings that provide functions besides those described below. Such additional components may be located above, between, or below the layers, coatings, and other components described below.

Figure 5A:
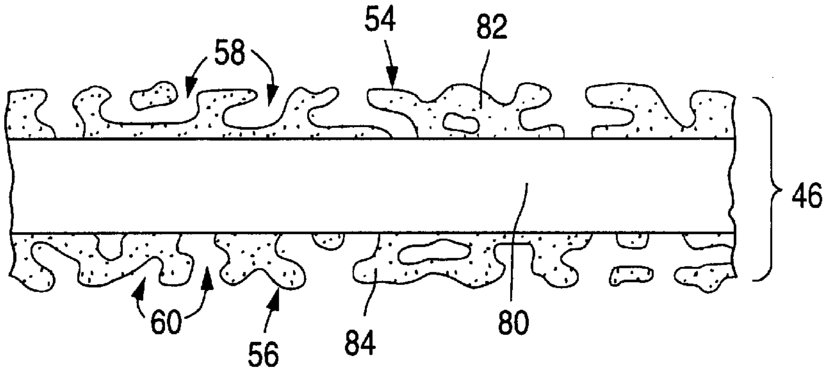
FIGS. 5*a*–5*d* are cross-sectional side views of four general embodiments of structures suitable for the main wall of the wall-shaped spacer in FIG. 2.

In FIG. 5*a*, main wall 46 is a primary wall-shaped electrically non-conductive spacer body consisting of a wall-shaped electrically non-conductive core substrate 80 and a pair of porous electrically non-conductive layers 82 and 84 situated on the opposite faces of wall-shaped core substrate 80. Porous layers 82 and 84, which are largely identical, may connect to each other around the ends or side edges of core substrate 80. The outside faces of layers 82 and 84 respectively form wall faces 54 and 56. Irregular pores 58 are randomly distributed largely throughout layer 82, while irregular pores 60 are randomly distributed largely throughout layer 84.

Core substrate 80 normally has approximately the general electrical characteristics prescribed above for main wall 46. Accordingly, the sheet resistance of core substrate 80 is normally approximately $10^8$–$10^{16}$ ohms/sq., preferably approximately $10^{10}$–$10^{14}$ ohms/sq., typically approximately $10^{11-10}12$ ohms/sq. The breakdown voltage of substrate 80 is normally at least approximately 1 volt/$\mu$m, preferably more than approximately 4 volt/$\mu$m, typically more than approximately 6 volt/$\mu$m. Substrate 80 is typically electrically resistive but may be electrically insulating.

Subject to meeting the preceding electrical characteristics, substrate 80 normally consists of ceramic, including glass-like ceramic. Primary candidates for the material of substrate 80 are oxides and hydroxides of one or more non-carbon cation elements in Groups 2a, 3b, 4b, 5b, 6b, 7b, 8, 1b, 2b, 3a, and 4a of Periods 2–6 of the Periodic Table, including the lanthanides.

The phrase "or more" as used in describing elements contained in candidate materials for a body means that two or more of the identified elements, e.g., the cation elements here in Groups 2a, 3b, 4b 5b, 6b, 7b, 8, 1b, 2b, 3a, and 4a of Periods 2–6 of the Periodic Table, may be present in the identified body, e.g., core substrate 80 here.

The candidate materials may be in mixed form, such as a solid solution, a multi-phase mixture, a multi-phase mixture of solid solutions, and so on, with respect to the cation elements. For example, in the case of a solid solution of binary mixed oxide and/or binary mixed hydroxide, the body contains $L_uM_vO_w$ and/or $L_xM_y(OH)_z$ where L and M are different ones of the identified cation elements, e.g., the elements in Groups 2a, 3b, 4b, 5b, 6b, 7b, 8, 1b, 2b, 3a, and 4a of Periods 2–6 of the Periodic Table, u, v, w, x, y, and z are numbers, O is oxygen, and H is hydrogen. For a multi-phase mixture of binary mixed oxide and/or binary mixed hydroxide, the body contains $L_uO_{w1}.M_vO_{w2}$ and/or $L_x(OH)_{z1}.M_y(OH)z_2$ where w1, w2, z1, and z2 are numbers. Similarly, for a multi-phase mixture of solid solutions of binary mixed oxide and/or binary mixed hydroxide, the body contains $L_{u1}M_{v1}O_{w1}.L_{u2}M_{v2}O_{w2}$ and/or $L_{x1}M_{y1}(OH)_{z1}.L_{x2}M_{y2}(OH)_{z2}$, where u1, v1, u2, v2, x1, y1, x2, and y2 are numbers.

Particularly attractive oxide and hydroxide candidates for core substrate 80 are those of beryllium, magnesium, aluminum, silicon, titanium, vanadium, chromium, manganese, iron, yttrium, niobium, molybdenum, lanthanum, cerium, praseodymium, neodymium, europium, and tungsten, including mixed oxide and/or hydroxide of two or more of these elements. In a typical implementation, substrate 80 consists largely of oxide one or more of aluminum, titanium, chromium, and iron.

Other candidates for the material of core substrate 80 include nitrides of one or more non-carbon elements in Groups 3b, 4b, 5b, 6b, 7b, 8, 1b, 2b, 3b, and 4a of Periods 2–6 of the Periodic Table, including the lanthanides. Further candidates for the core substrate material are carbides of one or more non-carbon elements in Groups 3b, 4b, 5b, 6b, 7b, 8, 1b, 2b, 3a, and 4a of Periods 2–6 of the Periodic Table, again including the lanthanides. Particularly attractive nitride and carbide substrate candidates are aluminum nitride and silicon carbide. Multiple ones of the various oxide, hydroxide, nitride, and carbide materials may be present in substrate 80.

The composition of core substrate 80 is typically relatively uniform throughout its bulk, i.e., away from the interfaces with porous layers 82 and 84. The composition of the bulk of substrate 80 can, however, vary somewhat from place to place. Although substrate 80 may be porous, any pores in substrate 80 are normally considerably different from pores 58 and 60. Any roughness along the faces of substrate 80 is normally considerably less than the porosity-produced roughness in wall faces 54 and 56. Substrate 80 normally has a thickness of 10–100 $\mu$m, typically 50 $\mu$m.

Each of porous layers 82 and 84 is of much greater sheet resistance than core substrate 80. Specifically, the sheet resistance of porous layer 82 or 84 is normally at least ten times, preferably at least one hundred times, the sheet resistance of substrate 80. This corresponds to each of layers 82 and 84 normally being at least ten times, preferably being at least one hundred times, greater resistance per unit length than substrate 80, the length dimension for resistance being taken from end electrode 52 to end electrode 50 (or vice versa). Equivalently stated, for the situation in which layers 82 and 84 each extend fully along the length of substrate 80, the resistance of each of layers 82 and 84 is normally at least ten times, preferably at least one hundred times, the resistance of substrate 80. With layers 82 and 84 being much more electrically resistive than substrate 80, layers 82 and 84 determine the electron-emission characteristics of main wall 46 while substrate 80 determines the other electrical characteristics of wall 46. This separation of electronic functions facilitates spacer design.

Each of porous layers 82 and 84 normally has an average electrical resistivity of $10^8$–$10^{14}$ ohm-cm at 25° C. The average electrical resistivity of layer 82 or 84 is preferably $10^9$–$10^{13}$ ohm-cm, more preferably $10^9$–$10^{12}$ ohm-cm, at 25° C. As mentioned above, electrically resistive materials have an electrical resistivity of 1–$10^{12}$ ohm-cm at 25° C., while electrically insulating materials have an electrical resistivity of greater than $10^{12}$ ohm-cm at 25° C. Consequently, layers 82 and 84 may be electrically resistive or electrically insulating.

Each of porous layers 82 and 84 is usually no more than 20 $\mu$m thick. The minimum thickness of layer 82 or 84 is normally 2 nm. The average thickness of each of layers 82 and 84 is normally 10–1,000 nm, typically 20–500 nm.

Subject to meeting the preceding electrical characteristics, porous layers 82 and 84 normally consist of ceramic, including glass-like ceramic. Candidate materials for layers 82 and 84 are oxides and hydroxides of one or more non-carbon elements in Groups 3b, 4b, 5b, 6b, 7b, 8, 1b, 2b, 3a, and 4a of Periods 2–6 of the Periodic Table, including the lanthanides. Particularly attractive oxide and hydroxide candidates for layers 82 and 84 are those of silicon, titanium, vanadium, chromium, manganese, iron, germanium, yttrium, zirconium, niobium, molybdenum, tin, cerium, praseodymium, neodymium, europium, and tungsten, including mixed oxide and/or hydroxide of two or more of these elements. Except for silicon, germanium, and tin, all of the particularly attractive oxides and hydroxides are oxides and hydroxides of transition metals.

FIG. **5*b* depicts an embodiment in which main wall 46 consists simply of a porous wall-shaped electrically non-conductive primary substrate 86. Pores 58 and 60 are randomly distributed largely throughout primary substrate 86 and basically form a single group of pores. The porosity of substrate 86 can vary from the center of substrate 86 to its faces 54 and 56**.

The composition of primary substrate 86 is typically relatively uniform throughout its bulk, i.e., away from rough faces 54 and 56. The composition of the bulk of substrate 86 can, however, vary somewhat from place to place. The composition of the material that forms faces 54 and 56 may be largely the same as, or somewhat different from, the material that forms the bulk of substrate 86.

Primary substrate 86 has substantially the general electrical characteristics prescribed above for main wall 46. That is, the sheet resistance of substrate 86 is normally $10^8$–$10^{16}$ ohms/sq., preferably $10^{10}$–$10^{14}$ ohms/sq., typically $10^{11}$–$10^{12}$ ohms/sq. The breakdown voltage of substrate 86 is normally at least 1 volt/$\mu$m, preferably more than 4 volt/$\mu$m, typically more than 6 volt/$\mu$m. Additionally, substrate 86 normally has an average electrical resistivity of $10^8$–$10^{14}$ ohm-cm at 25° C. The electrical resistivity of substrate 86 is preferably $10^9$–$10^{13}$ ohm-cm at 25° C. In light of this, substrate 86 is typically electrically resistive but may be electrically insulating.

Subject to the preceding considerations on spacer wall constituency and average electrical resistivity, substrate 86 normally consists of ceramic, including glass-like ceramic. Candidates for the ceramic in substrate 86 include all of the materials described above for core substrate 80 and rough layers 82 and 84. The thickness of primary substrate 86 is normally 10–100 $\mu$m, typically 50 $\mu$m.

FIGS. **5*c* and 5*d* illustrate two embodiments in which a pair of generally conformal electrically non-insulating coatings 88 and 90 are respectively situated on opposite faces of a primary porous-faced wall-shaped electrically non-conductive body. The term "conformal" here means that coatings 88 and 90 approximately conform to the surface typology of the underlying primary wall and thus approximately replicate its porosity-produced facial roughness. The outside faces of conformal coatings 88 and 90 respectively form rough faces 54 and 56 of main wall 46. Coatings 88 and 90 normally consist of material whose total natural electron yield coefficient a is less than coefficient σ of the underlying material of the primary wall. Total natural electron yield coefficient σ of coatings 88 and 90** is normally no more than 2.5, preferably no more than 2.0, more preferably no more than 1.6.

Two effects operate together in the embodiments of FIGS. **5*c* and 5*d* to reduce the total electron yield that arises when high-energy primary electrons strike conformal coatings 88 and 90 during FED operation. The roughness which is present along the opposite faces of the primary wall in the present FED and which is replicated in the contours of coatings 88 and 90 causes the total electron yield to decrease for the reasons discussed above. The material normally used to form coatings 88 and 90** leads to further reduction in the total electron yield. Total roughness-modified electron yield coefficient σ* in the embodiments of FIGS. **5*c* and 5*d*** is thus lower than coefficient σ* that would arise solely from the roughness in the faces of the primary wall.

Figure 5B:
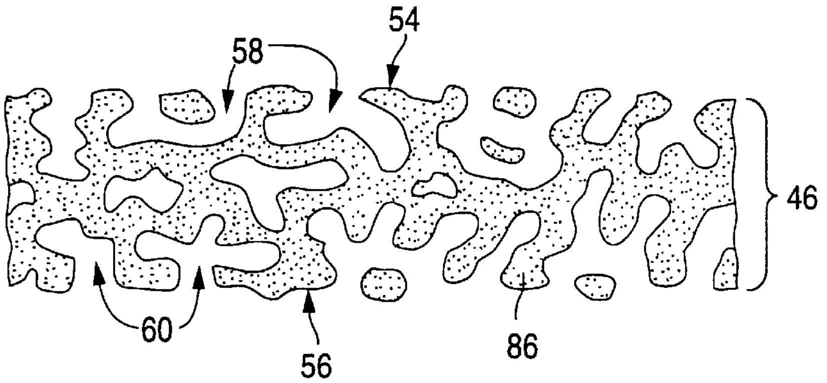
Figure 5C:
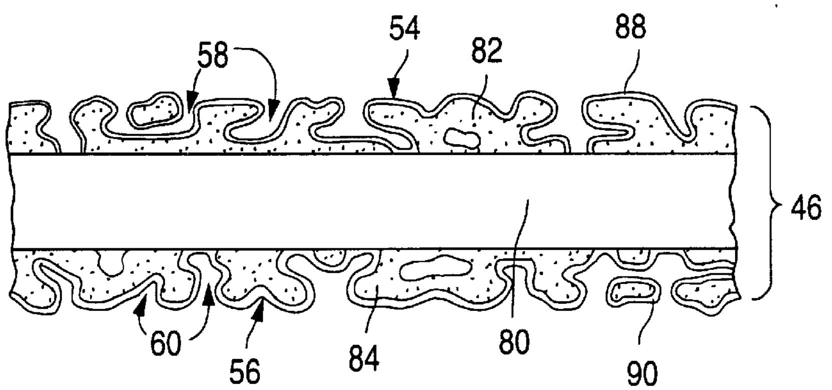
Figure 5D:
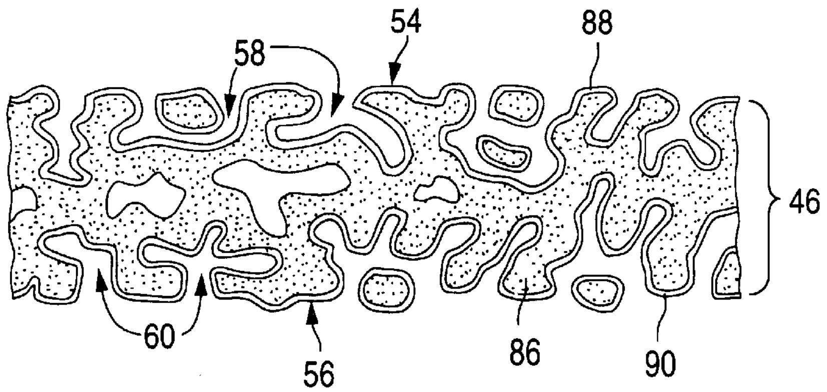

The primary wall in FIG. **5*c* consists of core substrate 80 and overlying rough-faced layers 82 and 84. Since conformal coatings 88 and 90 are situated respectively on rough layers 82 and 84, total natural electron yield coefficient σ of coatings 88 and 90 is normally less than coefficient σ of layers 82 and 84 in FIG. 5*a*. The primary wall in FIG. 5*d* is formed with primary porous-faced substrate 86. In FIG. 5*d*, total natural electron yield coefficient a of conformal coatings 88 and 90 is less than coefficient a of substrate 86. Components 80, 82, 84, and 86 in FIGS. 5*c* and 5*d* may be formed with any of the materials respectively described above in connection with FIGS. 5*a* and 5*b*** for these main-wall components.

Conformal coatings 88 and 90 typically consist principally of carbon in the form of one or more of amorphous carbon, graphite, and diamond-like carbon. The material, either rough layers 82 and 84, or rough-faced substrate 86, that directly underlies coatings 88 and 90 typically consists of oxide of one or more of aluminum, silicon, vanadium, titanium, chromium, iron, tin, and cerium when coatings 88 and 90 are formed primarily with carbon. Alternative or additional candidates for coatings 88 and 90 include oxide of one or more of chromium, cerium, and neodymium.

The thickness of each of conformal coatings 88 and 90 is normally 1–100 nm, typically 5–50 nm. In the embodiment of FIG. **5*c*, the combination of rough layer 82 and coating 88 or rough layer 84 and coating 90 meets the various sheet resistance, resistance, resistance per unit length, and electrical resistivity specifications given above solely for rough layer 82 or 84 in the embodiment of FIG. 5*a***.

Fabrication of Flat-Panel Display, Including Spacer

The present FED is manufactured in the following manner. Backplate structure 20, faceplate structure 22, spacer walls 24, and the peripheral outer wall (not shown) are fabricated separately. Components 20, 22, and 24 and the outer wall are then assembled to form the FED in such a way that the pressure in sealed enclosure 26 is at a desired high vacuum level, typically $10^{-7}$ torr or less. During FED assembly, each spacer wall 24 is suitably positioned between plate structures 20 and 22 such that each of rough faces 54 and 56 extends approximately perpendicular to both of plate structures 20 and 22.

Spacer 24 can be fabricated in a variety of ways. In one general spacer fabrication process, the starting point is a flat structural substrate that serves as a precursor to core substrate 80 in FIG. 5*a* or 5*c*. The precursor structural substrate is typically large enough for at least four substrates 80 arranged rectangularly in multiple rows and multiple columns. The precursor substrate is bonded along one of its faces to a flat face of a support structure using suitable adhesive. A patterned layer of electrically non-insulating face-electrode material is formed on the other face of the precursor substrate. A blanket protective layer is provided over the patterned face-electrode layer and the exposed portions of the precursor substrate.

Using a suitable cutting device such as a saw, the resulting combination of the precursor substrate, the patterned face-electrode layer, and the protective layer is cut into multiple segments. Each segment of the precursor substrate in the combination constitutes one of core substrates 80. Although the cuts may extend partway into the support structure, the support structure remains intact. At this point, one or more face electrodes formed from the patterned face-electrode layer are situated on the upper face of each substrate 80.

A shadow mask is placed above core substrates 80 and the overlying material, including above the segments of the protective layer, at the intended locations for the side edges of substrates 80, i.e., the substrate edges that extend in the forward (or reverse) electron-travel direction and thus perpendicular to the ends of substrates 80. With the segments of the protective layer overlying substrates 80, electrically non-insulating end-electrode material is deposited on the ends of substrates 80 to form end electrodes 50 and 52 on opposite ends of each substrate 80. The shadow mask prevents the end-electrode material from being deposited on the side edges of substrates 80. The segments of the protective layer are removed. Substrates 80, along with the various electrodes, are removed from the support structure by dissolving the remainder of the adhesive.

Porous layers 82 and 84 are subsequently formed on opposite faces of each core substrate 80 to produce main wall 46 of FIG. 5*a*. Since the patterned face-electrode material is situated on one face of each substrate 80, either porous layer 82 or porous layer 84 overlies the patterned face-electrode material. If desired, conformal coatings 88 and 90 can be respectively provided along layers 82 and 84 to produce main wall 46 of FIG. 5*c*. Techniques such as sputtering, evaporation, chemical vapor deposition, and deposition from a liquidous composition, e.g., a solution, colloidal mixture, or slurry, can be employed to form conformal coatings 88 and 90.

Various modifications can be made to the preceding spacer fabrication process. As one alternative, a pair of rough-faced porous layers that serve as precursors to porous layers 82 and 84 can be respectively provided on the opposite faces of the precursor substrate before the bonding operation at the beginning of the fabrication process. The resulting combination is then bonded along the rough face of one of layers 82 and 84 to the support structure. Subject to this change, further processing is performed as described above. In each final spacer wall 24, the patterned face-electrode material overlies one of porous layers 82 and 84. If conformal coatings 88 and 90 are present, one of them overlies the patterned face-electrode material.

As another alternative, both the formation of the porous precursors to porous layers 82 and 84 and the formation of a pair of conformal coatings that serve as precursors to conformal coatings 88 and 90 can be performed before the bonding operation. The resulting structure at this point appears, in part, as shown in FIG. 5*c*. The combination of the precursor substrate, the two porous precursor layers, and the two precursor conformal coatings is then bonded along the rough face of one of the precursor coatings to the support structure. Subject to this change, further processing is again conducted as described above. In each final spacer wall 24, the patterned face-electrode material overlies one of conformal coatings 88 and 90.

In the first-mentioned alternative, a rough-faced generally wall-shaped substrate that serves as a precursor to rough-faced primary substrate 86 can replace the combination of the precursor to core substrate 80 and the precursors to porous layers 82 and 84. Main wall 46 in resulting spacer wall 24 therefore appears as shown in FIG. 5*b* if conformal coatings 88 and 90 are absent or as shown in FIG. 5*d* if coatings 88 and 90 are present. When coatings 88 and 90 are present, one of them overlies the patterned face-electrode material. This replacement can also be performed in the second-mentioned alternative above. Since coatings 88 and 90 are present in this case, main wall 46 in final spacer wall 24 appears as shown in FIG. 5*d*, the patterned face-electrode material now overlying one of coatings 88 and 90.

The patterned face-electrode layer is typically formed by depositing a blanket layer of the desired face-electrode material and selectively removing undesired parts of the face-electrode material using a suitable mask to prevent the face-electrode material from being removed at the intended locations for the face electrodes. Alternatively, the patterned face-electrode layer can be selectively deposited using, for example, a shadow mask to prevent the face-electrode material from accumulating at undesired locations. When the patterned face-electrode material overlies one of conformal coatings 88 and 90 and/or one of porous layers 82 and 84, use of this alternative avoids possible contamination of wall faces 54 and 56 with material used in forming the face electrodes.

Other modifications can be made to the foregoing spacer fabrication process. For example, the support structure can be eliminated. End electrodes 50 and 52 can be formed in different ways than described above. Instead of cutting the precursor substrate into core substrates 80 and then using a shadow mask to prevent the end-electrode material from being deposited on the side edges of substrates 80, the precursor substrate and overlying material can be cut into strips that each contain a row (or column) of substrates 80 arranged side edge to side edge. After the end-electrode material is deposited, the strips are then cut into segments that each contain one substrate 80. In some cases, the formation of end electrodes 50 and 52 and/or the formation of face electrodes such as face electrodes 48 can be eliminated. The spacer fabrication process is then simplified accordingly.

All of the steps involved in the formation of the patterned face-electrode material, end electrodes 50 and 52, porous layers 82 and 84, and conformal coatings 88 and 90, to the extent that these components are present, can be performed directly on each substrate 80 or 86 rather than on a larger precursor to each substrate 80 or 86. In the general spacer fabrication process first mentioned above and in the variations, the end result is that spacers 24, each containing at least a segment of material that variously forms substrate 80 or 86, layers 82 and 84, when present, and coatings 88 and 90, when present, are positioned between plate structures 20 and 22.

Each set of (a) FIGS. 6*a*–6*d*, (b) FIGS. 9*a*, 9*b*, and 10*a*–10*d*, (c) FIGS. 9*a*, 9*b*, and 11*a*–11*d*, (d) FIGS. 12*a*–12*d*, (e) FIGS. 14*a*–14*c*, (f) FIGS. 15*a*–15*c*, and (g) FIGS. 19*a*–19*c* (discussed further below) illustrates a process for manufacturing a porous-faced structure suitable for being used partially or fully as main wall 46 in one or more of FIGS. 5*a*–5*d*. In each of these processes, material is formed over core substrate 80 or a larger precursor substrate from which two or more of substrates 80 can be made. To simplify the description of these processes, both substrate 80 and the larger precursor substrate are referred to in connection with each of these processes as the "core substrate" and are identified with reference symbol "80".

Fabrication of Porous-Faced Structure Suitable for Use in Main Spacer Wall

FIGS. 6*a*–6*d* (collectively "FIG. 6") illustrate a process for manufacturing a porous-faced structure suitable for full or partial use as main spacer wall 46 in FIG. 5*a* or 5*c* and thus in the flat-panel CRT display of FIG. 1. When the structure made according to the process of FIG. 6 is so utilized, the manufacturing steps illustrated in FIG. 6 are appropriately employed in the above-described processes and process variations for fabricating spacer wall 24.

The starting point for the process of FIG. 6 is core substrate 80. See FIG. 6*a*. A pair of largely identical thin liquid-containing films 92 are formed on the opposite faces of core substrate 80. FIG. 6*b* illustrates one of thin films 92. Each film 92 consists of precursor material and a liquid interspersed with each other. The precursor material may be in liquid form or solid form, e.g., solid particles. Other material in liquid form, solid form, or/and even gaseous form may be present in films 92 to facilitate or promote the process of FIG. 6.

Various techniques can be utilized to form thin liquid-containing films 92 on core substrate 80. For example, portions of a liquid-containing composition of the precursor material and the liquid can be deposited on core substrate 80. Spinning may be utilized to ensure that each film 92 is of relatively uniform thickness. Alternatively, core substrate 80 can be dipped in the liquid-containing composition.

Thin films 92 can be sprayed on core substrate 80. A vapor of the liquid-containing composition can be condensed on substrate 80 to create films 92, especially when the precursor material is in liquid form. Also, films 92 can be electrostatically deposited on substrate 80. For example, with substrate 80 provided with electric charge of one polarity, an aerosol formed with liquid droplets bearing electric charge of the opposite polarity can be sprayed over substrate 80. The aerosol droplets may include solid particles. The formation of films 92 can be performed in a homogeneous or heterogeneous manner. Each film 92 may consist of one or more coats.

Thin films 92 are processed in substantially the same way in subsequent steps. For simplicity, only one of films 92 is dealt with in the remainder of the process description for FIG. 6.

Figure 6A:
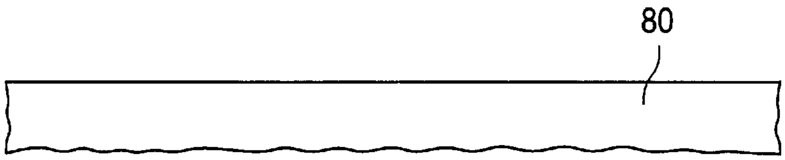
FIGS. 6*a*–6*d* are cross-sectional side views representing a set of steps that employ the invention's teachings for creating a porous-faced structure suitable for full or partial use in the main spacer wall of FIG. 5*a* or 5*c*.
Figure 6B:
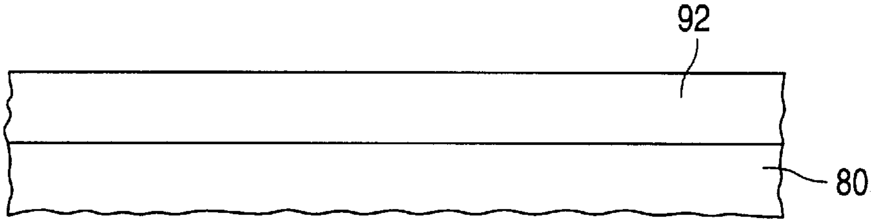
Figure 6C:
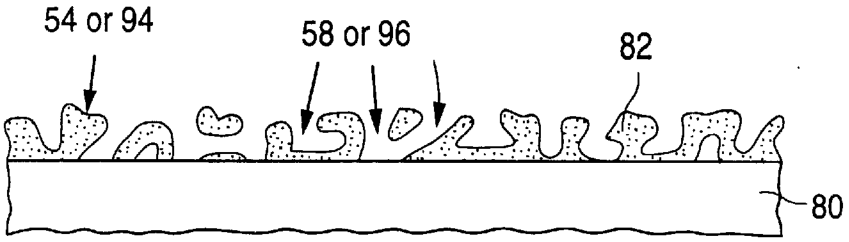

Thin liquid-containing film 92 illustrated in FIG. 6*b* is processed in a manner suitable to convert it into solid porous layer 82. FIG. 6*c* depicts the resultant structure. Various techniques, described further below, can be employed to produce porous layer 82 from thin film 92. Temporarily deferring discussion of the techniques for converting film 92 into layer 82, the structure in FIG. 6*c* represents main wall 46 of FIG. 5*a* if conformal coating 88 is not to be provided over layer 82. Irregular pores 58 extend into layer 82 along rough face 54.

Figure 6D:
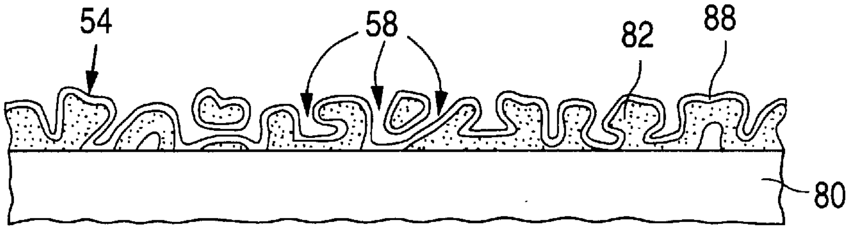

If conformal coating 88 is to be provided over porous layer 82, layer 82 has a rough face 94 along which there are irregular pores 96. Upon forming coating 88 on rough face 94, the structure appears as shown in FIG. 6*d*. This structure represents main wall 46 of FIG. 5*c*. Coating 88 extends into pores 96 along rough face 54. Pores 96, including those partially filled with coating 88, respectively become pores 58.

Turning now to the techniques for converting thin liquid-containing film 92 into solid porous layer 82, thin film 92 is typically first transformed into a gel, i.e., a semi-solid structure, or a liquid-filled open network of solid material, dependent on the nature of the precursor material in film 92. The liquid is then largely removed from the gel or open network of solid material to create layer 82. The transformation of film 92 into layer 82 is performed generally according to the porous-ceramic preparation techniques described in Saggio-Woyansky et al, "Processing of Porous Ceramics," *Technology*, November 1992, pages 1674–1682, or the sol-gel techniques described in Hench et al, "The Sol-Gel Process," *Chem. Rev.*, Vol. 90, No. 1, pages 33–72, and Brinker et al, "Sol-Gel Thin Film Formation," *J. Cer. Soc. Japan, Cent. Mem. Iss.*, Vol. 99, No. 10, 1991, pages 862–877. The contents of Saggio-Woyansky et al, Hench et al, and Brinker et al are incorporated by reference herein.

In the case of a gel, the precursor material in thin film 92 is typically formed with a ceramic precursor that contains desired ceramic cation species. More particularly, the ceramic precursor is normally metalorganic polymeric material, where the Group 4a cation species silicon and germanium, although generally considered to be semiconductors, are here viewed as metals. Using a sol-gel procedure, the ceramic precursor is converted by polymerization into support material whose shape largely defines the shape of the gel. Liquid is distributed largely throughout the gel.

The ceramic precursor typically consists of alkoxide of one or more metals and metal-like elements. As the alkoxide precursor undergoes polymerization, atoms of the precursor cross-link to form the gel support material principally as metallic oxide. Metallic hydroxide may also be present in the gel support material.

The metallic cations in the ceramic precursor for the gel consist of one or more non-carbon elements in Groups 3b, 4b, 5b, 6b, 7b, 8, 1b, 2b, 3a, and 4a of Periods 2–6 of the Periodic Table, including the lanthanides. Particularly attractive ceramic cation candidates are silicon, titanium, vanadium, chromium, manganese, iron, germanium, yttrium, zirconium, niobium, molybdenum, tin, cerium, praseodymium, neodymium, europium, and tungsten. Two or more of these cation candidates may be present in the ceramic precursor, typically in mixed form. Except for silicon, germanium, and tin, all of the particularly attractive candidates for the ceramic cations are transition metals. In one implementation, the metallic cations in the ceramic precursor consist principally of silicon.

The ceramic precursor to the support material in the gel may be monomeric, partially hydrolyzed, and/or oligomeric. Other types of ceramic precursor material may be employed in place of, or in combination with, alkoxide precursor. Examples of alternative ceramic precursors that have silicon cations include alkoxysilanes, alkylalkoxysilanes, acetoxysilanes, chlorosilanes and alkylchlorosilanes. In any event, the gel is largely centered around bonds between oxygen and the metallic cations of the ceramic precursor. Hydroxyl (OH) groups may also be present, especially along the pore surfaces.

The liquid used in thin film 92 to form the polymeric gel is normally an organic solvent. Examples of the organic solvent include alcohols such as ethanol and isopropanol, ketones such as acetone and methylisobutylketone, and polyols such as ethylene glycol. Other organic liquids in which the ceramic precursor is miscible may also be used for the organic solvent. Additional liquid is typically produced in the gel as a byproduct of the gel processing. The rate at which the gel forms is determined by pH, temperature, water content, precursor reactivity, and evaporation rate. One or more catalysts may be employed to control the gel reaction polymerization rate.

Rather than being polymeric, the precursor material in thin liquid-containing film 92 may consist of ceramic precursor particles distributed largely throughout thin film 92. The conversion of film 92 into porous layer 82 then entails going through an intermediate stage of a gel or a liquid-filled open network of solid material. In the case of a liquid-filled open solid network, the ceramic precursor particles are converted into solid support material whose shape defines the shape of the open solid network. A similar phenomenon occurs in the gel case except that the support material produced from the ceramic precursor material is semi-solid rather than solid. Liquid occupies interstices in the gel or open solid network.

Candidates for the ceramic precursor particles are oxides, hydroxides, carbides, carbonates, nitrides, nitrates, phosphides, phosphates, sulfides, sulfates, chlorides, chlorates, acetates, citrates, and oxalates of one or more metals and metal-like elements. The precursor particles may include two or more of these anion species. Particularly attractive anion species for the precursor particles are oxides, hydroxides, carbonates, nitrates, sulfates, acetates, citrates, and oxalates.

Candidates for the metallic cations in the ceramic precursor particles are non-carbon elements in Groups 3b, 4b, 5b, 6b, 7b, 8, 1b, 2b, 3a, and 4a of Periods 2–6 of the Periodic Table, including the lanthanides. Particularly attractive cation candidates for the precursor particles are silicon, titanium, vanadium, chromium, manganese, iron, germanium, yttrium, zirconium, niobium, molybdenum, tin, cerium, praseodymium, neodymium, europium, and tungsten. The precursor particles may have two or more of these cation elements, typically in mixed form. Once again, except for silicon, germanium, and tin, all of the particularly attractive cation candidates are transition metals. In a typical implementation, the ceramic particles consist of oxide, hydroxide, and/or nitrate of chromium. The average diameter of the ceramic particles is normally 1–500 nm, preferably 2–100 nm.

When the precursor material consists of ceramic precursor particles, the liquid in thin film 92 typically consists of water. The ceramic precursor particles normally become suspended in the water or other liquid. The liquid may contain surface-active agents for reducing surface tension and increasing storage stability. Storage stability may also be increased by including dilute acids or bases in the liquid.

The precursor material may be formed with both polymeric ceramic material and ceramic precursor particles. Regardless of whether the precursor material consists of polymeric ceramic material or ceramic precursor particles or both, liquid is normally removed from the gel or liquid-filled open solid network without causing the support material to fully collapse and fill the space previously occupied by the liquid. The gel or open solid network thereby becomes a solid porous layer. The liquid removal is typically conducted by drying the gel or open solid network at approximately room temperature, i.e., approximately 25° C. When a polymeric ceramic precursor is utilized to form the support material in film 92, further cross-linking may occur during the liquid removal.

Heat is typically applied to the solid porous layer. The heat causes atoms of the precursor material to bond to one another. In particular, the heat causes further cross-linking when the precursor material is polymeric. Additional bonds between oxygen and the metallic cations are formed. When the precursor material consists of particles, the heat causes bonds to form between oxygen and the metallic cations in the particles. The heat also causes bonds to form between oxygen and metallic cations located between the particles. Inasmuch as heat causes the solid porous layer to densify and become less porous, the heat treatment is conducted in such a manner that the porosity does not become unacceptably low.

FIG. 6*c* illustrates the structure at the end of liquid removal and heat treatment. The solid porous layer created from liquid-containing thin film 92 is now porous layer 82. When the precursor material is polymeric, porous layer 82 consists largely of oxide and/or hydroxide of one or more of the metallic cations identified above for the ceramic precursor. When ceramic precursor particles are used in creating film 92, porous layer 82 contains much of the metallic ions that were present in the particles. However, even if no metallic oxide and/or hydroxide was initially present in the ceramic precursor particles, the heat treatment normally causes some oxide and/or hydroxide to form with the metallic cations in the particles.

In a variation of the procedure for converting thin liquid-containing film 92 into solid porous layer 82, the precursor material and the liquid in thin film 92 can be of such a nature that the porosity in solid layer 82 occurs at least partly due to gas produced during the processing steps. For example, water vapor and/or volatile decomposition products such as carbon dioxide and sulfur dioxide can be produced by decomposition from part of the precursor material and/or the liquid in film 92. As a solid porous layer is created from the gel or open solid network, the evolution of gas causes the porosity to increase and, with suitable control, appropriately counters any tendency of the solid porous layer to shrink.

An alternative technique for producing porous layer 82 from thin film 92 entails using sacrificial carbon-containing, normally organic, material to create or enhance porosity. The sacrificial carbon-containing material is part of the precursor material in thin film 92. The remaining precursor material, referred to here as the main precursor material, can be polymeric, typically inorganic, and/or can consist of ceramic precursor particles. In either case, the sacrificial carbon-containing material can be bonded to the metallic cations in the main precursor material or/and can be added in separate form, such as particles, to thin film 92. When the sacrificial material is distinct from the main precursor material, the two parts of the precursor material can be introduced into the liquid-containing composition later used to form thin film 92. The sacrificial material can also be (a) provided on substrate 80 before film 92 is provided and over substrate 80 or (b) introduced into film 92 after it is otherwise provided on core substrate 80.

Subject to incorporating the sacrificial carbon-containing material into thin film 92, the processing of film 92 can be conducted according to the sol-gel or porous-ceramic techniques described above to produce an intermediate solid porous film which is basically the same as porous layer 82 except that the intermediate solid porous layer contains the sacrificial material. Layer 82 is then created by partially or substantially removing the sacrificial material from the intermediate solid film.

Pyrolysis, oxidation, or/and evaporation can be employed to partially or substantially remove the sacrificial carbon-containing material from the intermediate solid film. Both carbon and non-carbon portions of the sacrificial material are normally removed. Pyrolysis is typically performed at 200–900° C., preferably 400–600° C., in an oxidizing environment. When the intermediate solid film is quite thin, e.g., the film thickness is in the vicinity of 1 $\mu$m or less, the pyrolysis temperature can normally be readily reduced to as little as 250° C. The partial or substantial removal of the sacrificial material can alternatively or additionally be performed by subjecting the sacrificial material to a plasma, an electron beam, ultraviolet light, a suitable oxidizing environment, or/and a suitable reducing environment.

Alternatively, the process operations involving the sacrificial carbon-containing material can be conducted in the foregoing way except that the intermediate solid porous layer created from the gel or open solid network is heat treated to such an extent that the porosity largely goes to zero. Porous layer 82 is then created by partially or substantially removing the sacrificial material from the intermediate porous film. In effect, porosity is re-introduced into layer 82. Again, both carbon and non-carbon portions of the sacrificial material are normally removed. The partial or substantial removal of the sacrificial material is performed in the manner described above. Creating layer 82 by this porosity re-introduction procedure is advantageous because the pore size and uniformity can be controlled well. Also, the mechanical strength of final main wall 46 is typically increased.

In another alternative, thin liquid-containing film 92 can be converted into an intermediate solid film having little, if any, porosity according to a procedure that does not entail going through a solid porous stage while the sacrificial carbon-containing material is present. For example, a dense intermediate solid film that contains the sacrificial material and metallic oxide and/or hydroxide can be created directly from film 92. The sacrificial material is then partially or substantially removed from the intermediate solid film to convert it into porous layer 82. Once again, both carbon and non-carbon components of the sacrificial material are normally removed. The partial or substantial removal of the sacrificial material is conducted as described above. Similar to what was said about the previous alternative, creating layer 82 according to this alternative enables the pore size and uniformity to be controlled well. Likewise final main wall 46 is of increased mechanical strength when layer 82 is created according to this alternative.

When the processing operations that involve the sacrificial carbon-containing material are conducted in the preceding manner, the resultant structure appears generally as shown in FIG. 6*c*. As a further alternative, the partial or substantial removal of the sacrificial material can be replaced with a step in which largely only the non-carbon part of the sacrificial material is largely removed. With suitable control, the carbon remainder of the sacrificial material forms a carbon coating that lies along the surfaces of the pores created by the removal of the non-carbon material. The resulting structure implements FIG. 6*d* in which conformal coating 88 consists principally of the remaining carbon material. A further description of this process is presented below in connection with FIGS. 14*a*–14*c*.

Part or all of the structure of FIG. 6*c* or 6*d* is, as indicated above, suitable for main spacer wall 46. Nonetheless, the structure of FIG. 6*c* or 6*d* can be utilized for other purposes. For instance, the structure of FIG. 6*c* or 6*d* can be employed as a catalyst or in a chemical gas sensor of high surface area.

Main Spacer Wall Having Porous Layer Constituted with Aggregates of Particles

Figure 7:
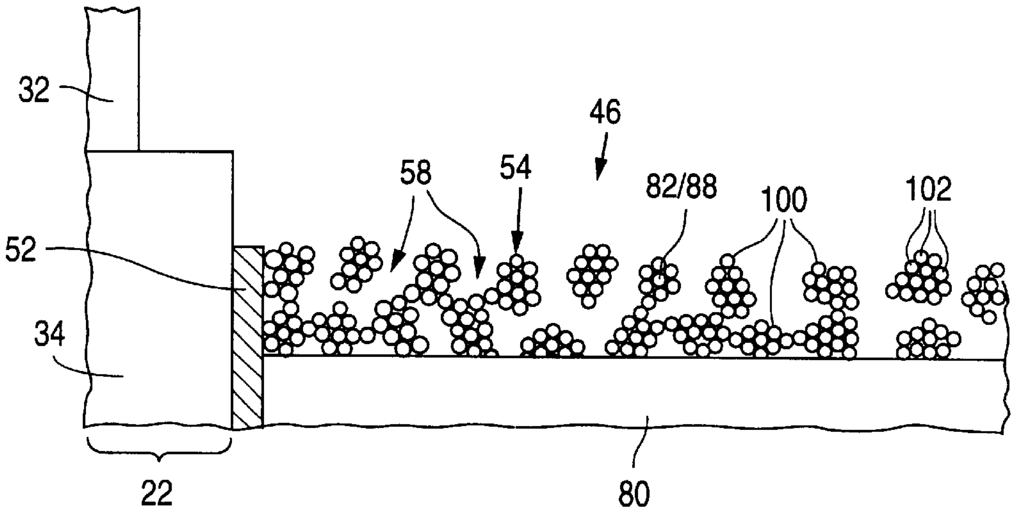
FIG. 7 is a cross-sectional view of a section of the display portion in FIG. 2 in which one porous layer in the main spacer wall of FIG. 5*c* is implemented with aggregates of particles according to the invention.

FIG. 7 depicts an embodiment of a portion of main spacer wall 46 along rough face 54, and an adjoining portion of faceplate structure 22. The embodiment of FIG. 7 implements the structure of FIG. 5*c* for the situation in which composite porous layer 82 and conformal coating 88 form a porous body consisting of fractal aggregates 100 bonded to one another. At the scale used in FIG. 7, coating 88 is too thin to be clearly distinguished from layer 82 and, except for the reference symbol 82/88, is not specifically illustrated. Pores 58 are located between adjoining ones of fractal aggregates 100 so as to achieve the porosity characteristics prescribed above.

Each fractal aggregate 100 is formed with multiple particles 102 bonded to one another. The number of particles 102 in each aggregate 100 typically varies from as little as 2 to as many as 1,000 or more. Particles 102 are typically roughly spherical. As a result, pores which are considerably smaller than pores 58 are present between adjoining ones of coated particles 102. The average diameter of particles 102 is 1–1,000 nm, preferably 5–200 nm.

Each particle 102 normally consists of a support particle and a particle coating that overlies part or all of the support particle. When particles 102 are so configured, they are often referred to as coated particles. The support particles in coated particles 102 are normally electrically non-conductive, i.e., the support particles consist of electrically insulating or/and electrically resistive material. The particle coatings likewise are normally electrically non-conductive.

Figure 8A:
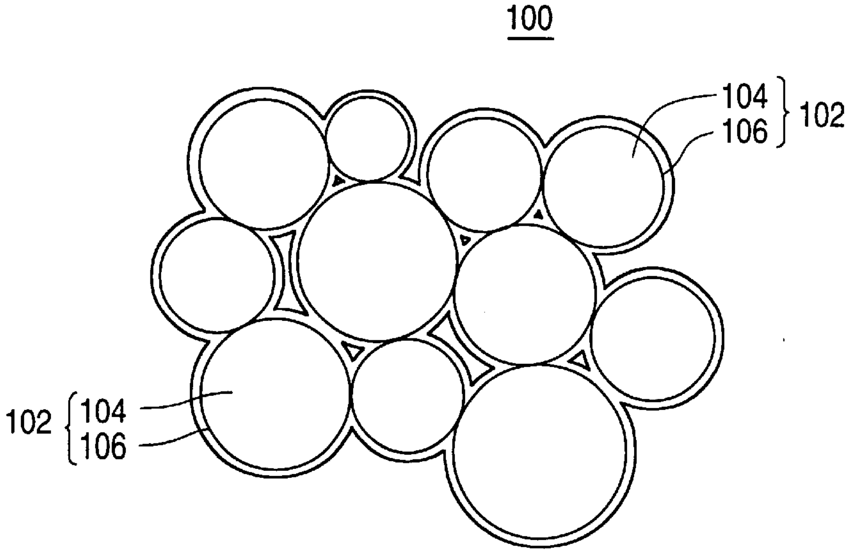
FIGS. 8*a* and 8*b* are cross-sectional views of two ways of implementing the particle aggregates in FIG. 7.
Figure 8B:
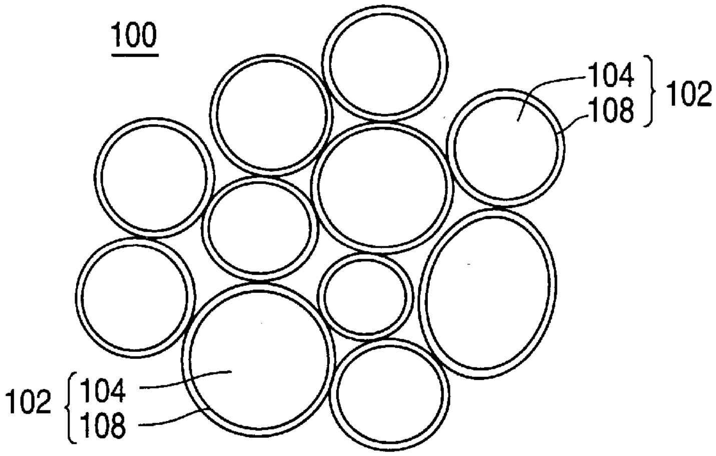

FIGS. 8*a* and 8*b* present two implementations of fractal aggregates 100 in which each coated particle 102 is formed with a support particle and an overlying particle coating. In both implementations, the average value of total natural electron yield coefficient $\sigma$ for the particle coatings is normally less than the average value of coefficient $\sigma$ for the support particles. The number of secondary electrons emitted by coated particles 102 when they are struck by high-energy primary electrons is thus lower than what would occur with aggregates formed solely with the support particles, i.e., without using the particle coatings. As described further below, a portion of the material of the particle coatings forms conformal coating 88 so that the structure of FIG. 7 implements main wall 46 of FIG. 5*c*.

In FIG. 8*a*, each coated particle 102 consists of a support particle 104 and a coating 106 that overlies part of particle 104. The bonding of coated particles 102 to one another in fractal aggregate 100 of FIG. 8*a* occurs along the outer surfaces of support particles 104 to such an extent that support particles 104 themselves form a bonded fractal support-particle aggregate. Particle coatings 106 increase the strength of the bonding of coated particles 102 in each fractal aggregate 100. The average thickness of particle coatings 106 is 0.2–100 nm, typically 10 nm.

Although not shown in FIG. 8*a*, each fractal aggregate 100 may include some support particles 104 which are largely internal to that aggregate 100 and which, while possible touching coated particles 102, are largely uncoated. That is, these internal support particles 104 lack particle coatings 106. The occurrence of totally uncoated support particles 104 occurs due to the way, discussed further below, in which aggregates 100 are formed to produce the structure of FIG. 8*a*. Since any uncoated support particles 104 are internal to each aggregate 100, the presence of uncoated support particles 104 does not have any significant effect on FED operation.

In FIG. 8*b*, each coated particle 102 is formed with a support particle 104 and a coating 108 that largely wholly overlies that particle 104. The bonding of coated particles 102 to one another in fractal aggregate 100 of FIG. 8*b* occurs along the outer surfaces of particle coatings 108. In some cases, the bonding may penetrate through coatings 108 so that two or more of coated particles 102 are bonded together along their support particles 104. As with coatings 106 in FIG. 8*a*, the average thickness of coatings 108 in FIG. 8*b* is 0.2–100 nm, typically 10 nm.

Support particles 104 normally consist of oxide or/and hydroxide of one or more metals and metal-like elements. Specifically, candidate materials for support particles 104 are oxides and hydroxides of one or more non-carbon elements in Groups 3b, 4b, 5b, 6b, 7b, 8, 1b, 2b, 3a, and 4a of Periods 2–6 of the Periodic Table, including the lanthanides. Particularly attractive oxides and hydroxides that can be utilized for support particles 104 are those of aluminum, silicon, titanium, chromium, iron, zirconium, cerium, and neodymium, including oxide and/or hydroxide of two or more of these elements, typically in mixed form. Except for aluminum and silicon, all of the particularly attractive support oxide/hydroxide candidates are oxides and hydroxides of transition metals.

Candidates for the material of particle coatings 106 or 108 consist of oxides and hydroxides of one or more of titanium, vanadium, chromium, manganese, iron, germanium, yttrium, zirconium, niobium, molybdenum, tin, cerium, praseodymium, neodymium, europium, and tungsten. Especially attractive oxides and hydroxides that can be utilized for coatings 106 or 108 are those of titanium, chromium, manganese, iron, zirconium, cerium, and neodymium, including oxide and/or hydroxide of two or more of these metals, typically in mixed form. All of the oxides and hydroxides especially attractive for coatings 106 and 108 are oxides and hydroxides of transition metals. Coatings 106 or 108 are normally, but not necessarily, of different chemical composition than support particles 104. Subject to this, coatings 106 or 108 typically consist of one or more of these especially attractive oxides and hydroxides when support particles 104 consist of oxide and/or hydroxide of one or more of aluminum, silicon, chromium, titanium, iron, zirconium, cerium, and neodymium. Coatings 106 or 108 may alternatively or additionally include carbon.

Figure 9A:
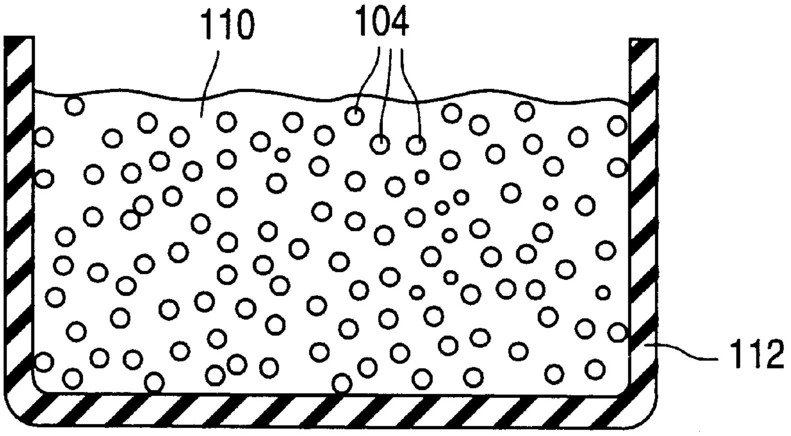
FIGS. 9*a* and 9*b* are cross-sectional side views representing a pair of steps in forming aggregates of support particles according to the invention.
Figure 9B:
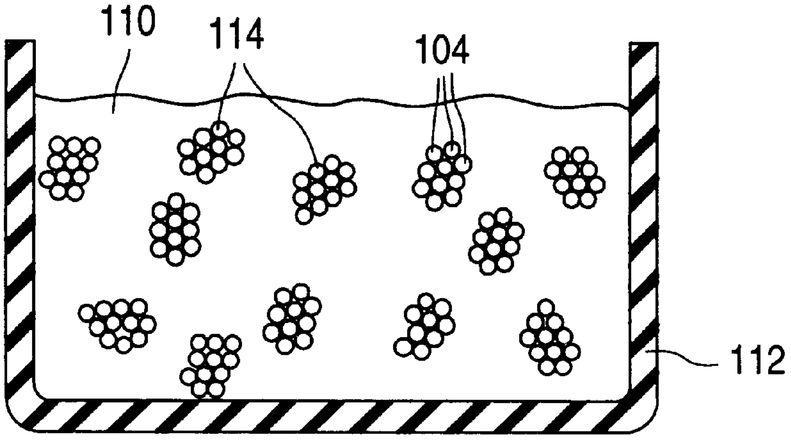

Porous layer 82 consisting of fractal aggregates 100 can be fabricated in various ways so that each aggregate 100 appears largely as depicted in FIG. 8*a* or 8*b*. FIGS. 9*a* and 9*b* (collectively "FIG. 9") depict an initial pair of steps in a process for manufacturing a structure that contains spacer wall 24 in which layer 82 is formed with aggregates 100 as depicted in FIG. 8*a*. The fabrication of a structure in which layer 82 consists of aggregates 100 as shown in FIG. 8*a* can be continued according to the process sequence of FIGS. 10*a*–10*d* (collectively "FIG. 10"), discussed further below, or according to the process sequence of FIGS. 11*a*–11*d* (collectively "FIG. 11"), also discussed further below.

The front-end process sequence of FIG. 9 begins with a liquidous colloidal composition 110 provided in a container 112. See FIG. 9*a*. Colloidal composition 110 consists of support particles 104 and a suitable liquid in which support particles 104 are dispersed. Should support particles 104 have a tendency to precipitate and accumulate on the bottom of container 112, an appropriate additive can be mixed into composition 110 to prevent particles 104 from precipitating. Alternatively or additionally, container 112 can be appropriately agitated to disperse particles 104 into the bulk of the liquid.

The liquid in colloidal composition 110 is formed with a principal constituent and possible one or more additives. As discussed further below, groups of support particles 104 are induced to come together and form separate fractal aggregates of particles 104 in the liquid. The characteristics of the principal constituent and any additive are of such a nature that support particles 104 form aggregates in a suitably short time period. The principal constituent, which is typically a volume-fraction majority of the liquid, is water or/and an organic solvent with a boiling point of 50–200° C. at 1 atmosphere. When support particles 104 consist of oxide and/or hydroxide of one or more of aluminum, silicon, titanium, chromium, iron, zirconium, cerium, and neodymium, the principal constituent is typically water or an alcohol, such as ethanol or isopropanol, whose 1-atm boiling point is 50–200° C. Additive material in the liquid provides various capabilities such as accelerating aggregation and promoting bonding of support particles 104 to one another.

With the composition and characteristics of support particles 104 and the liquid being appropriately chosen, particles 104 are induced to bond together in separate groups to form fractal support-particle aggregates 114. See FIG. 9*b*. Various techniques can be employed to promote the aggregation of particles 104 into support-particle aggregates 114. For example, heat can be applied to colloidal composition 110. Changes in pH, implemented with one or more additives such as an acid or a base, can be utilized to promote the particle aggregation. The aggregation can also be promoted by changing the ionic strength of composition 110.

In the example of FIG. 9*b*, the aggregation of particles 104 to form support-particle aggregates 114 occurs while colloidal composition 110 is in container 112. If support-particle aggregates 114 tend to precipitate and form a single large aggregate along the bottom of container 112, container 112 can be suitable agitated to avoid precipitation at this stage. As discussed further below, the aggregation of particles 104 can partially or totally occur after one or more portions of composition 110 are provided on a suitable substrate.

Turning to the back-end process sequence of FIG. 10, a pair of largely identical portions 116 of colloidal composition 110 are provided on the opposite faces of core substrate 80. FIG. 10*a* depicts one of portions 116. Each portion 116 is a relatively thin liquidous colloidal film-like body in which support particles 104 are dispersed at a relatively uniform concentration. The film thickness is 10 nm–10 μm, typically 100 nm–1 μm Colloidal films 116 can be formed over core substrate 80 in various ways such as dipping substrate 80 in colloidal composition 110, spraying films 116 over substrate 80, depositing portions of composition 110 on the opposite faces of substrate 80 and, as necessary, spinning the deposited portions to form each film 116 at a relatively uniform thickness. As indicated above, the aggregation of support particles 104 to form aggregates 114 can partially or totally occur after films 116 are provided on substrate 80.

Colloidal films 116 are processed substantially the same in subsequent steps. For simplicity only one of films 116 is dealt with in the remainder of the process description for FIG. 10.

Figure 10A:
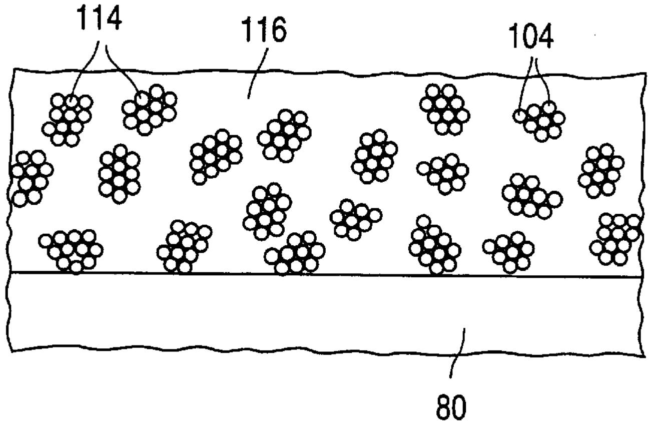
FIGS. 10*a*–10*d* are cross-sectional side views representing a set of steps that employ the invention's teachings for creating a porous layer from the particle aggregates in FIG. 9*b* so that the particle aggregates appear generally as shown in FIG. 8*a*.
Figure 10B:
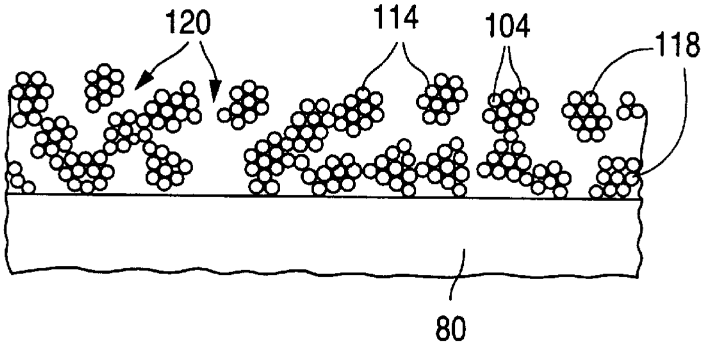
Figure 10C:
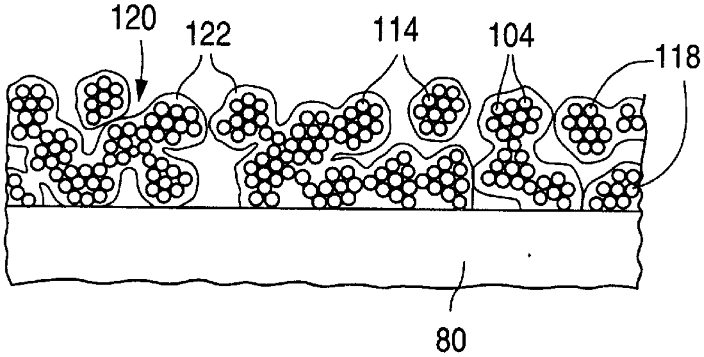

Fractal support-particle aggregates 114 in illustrated colloidal film 116 are caused to bond together in an open manner to form a solid film-like porous body 118 as shown in FIG. 10*b*. Irregular pores 120 extend between bonded support-particle aggregates 114 in solid porous film 118. Heat can be applied to promote the bonding of support-particle aggregates 114 to one another. Changes in the pH and/or ionic strength of colloidal composition 100, the precursor to colloidal film 116, can be utilized to promote the aggregate bonding action. The liquid in film 116 is also removed. The liquid removal can be performed by drying film 116 at approximately room temperature and/or by applying heat. The bonding of support-particle aggregates

114 to form solid film 118 may occur during and/or before the liquid removal.

Material 122, which constitutes a precursor to particle coatings 106, is formed over support particles 104 in bonded fractal support-particle aggregates 114 of porous film 118. See FIG. 10*c*. Although not evident in FIG. 10*c*, precursor material 122 typically covers portions of support particles 104 that are internal to bonded aggregates 114 in a manner similar to that shown in FIG. 8*a* for particles coatings 106.

When particle coatings 106 are to consist of oxide or/and hydroxide of one or more of (a) titanium, (b) chromium, (c) manganese, (d) iron, (e) zirconium, (f) cerium, and (g) neodymium, candidates for precursor material 122 respectively are (a) ethoxide or/and isopropoxide of titanium, (b) carbonate, chloride, hydroxide, nitrate, or/and sulfate of chromium, (c) carbonate, chloride, hydroxide, nitrate, or/and sulfate of manganese, (d) carbonate, chloride, hydroxide, nitrate, or/and sulfate of iron, (e) butoxide, carbonate, chloride, ethoxide, hydroxide, isopropoxide, nitrate, or/and sulfate of zirconium, (f) ammonium cerium nitrate or/and carbonate, chloride, hydroxide, nitrate, or/and sulfate of cerium, and (g) acetate, carbonate, chloride, hydroxide, nitrate, or/and sulfate of neodymium. If precursor material 122 contains hydroxide of chromium, manganese, iron, zirconium, cerium, or/and neodymium, the hydroxide is typically converted into oxide in particle coatings 106. Although precursor material 122 is typically a salt, material 122 can be polymeric. In some cases, material 122 is metalorganic or/and organometallic.

Precursor material 122 can be formed over support particles 104 of solid porous film 118 in various ways. One technique is to prepare a liquidous composition of a basic particle-coating precursor and a suitable liquid. The particle-coating precursor, which contains the material that constitutes precursor material 122, may be dissolved or dispersed in the liquid. A thin-film portion of the liquidous composition is provided over support particles 104 in porous film 118. This can be accomplished by dipping the structure of FIG. 10*b* into the liquidous composition, spraying a very thin film of the liquidous composition on porous film 118, using a deposition/spinning technique to form a very thin liquidous film on porous film 118, condensing a portion of a vapor of the liquidous composition on porous film 118, or electrostatically depositing a thin film of the liquidous composition on porous film 118. In any event, the liquid is removed from the thin precursor-material film so that precursor material 122 coats support particles 104.

Alternatively, precursor material 122 can be directly deposited on support particles 104 of porous film 118. One candidate direct deposition technique is coprecipitation. Another is heterocoagulation.

Figure 10D:
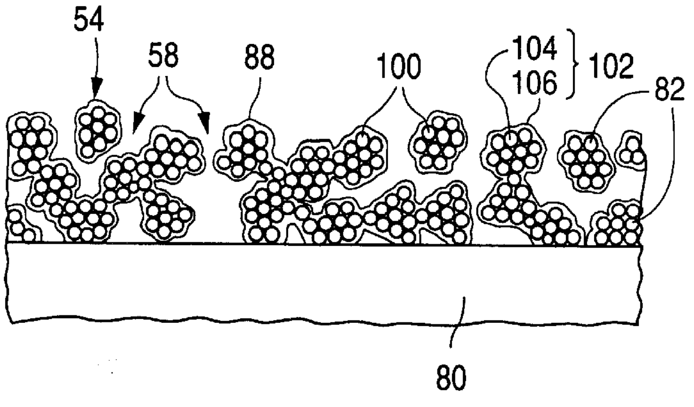

An operation is performed that causes precursor material 122 to be converted into particle coatings 106. FIG. 10*d* depicts the resultant structure in which support-particle aggregates 114 have become fractal aggregates 100 of coated particles 102, coated porous film 118 has become porous layer 82, pores 120 have become pores 58, and the portion of precursor material 122 along rough face 54 has become conformal coating 88. Each fractal aggregate 100 of composite porous body 82/88 in FIG. 10*d* appears as shown in FIG. 8*a*.

The conversion of precursor material 122 into particle coatings 106 is typically achieved by heating material 122. Alternatively or additionally and also dependent on the particular characteristics of precursor material 122, water or/and changes in pH can be utilized to convert material 122 into coatings 106. When material 122 is formed by removing liquid from a thin liquidous film that contains the basic particle-coating precursor, the liquid removal can be done partially or fully at the same time as the heating operation. Also, a non-heating conversion technique can be performed while material 122 is simply dried at approximately room temperature.

The process sequence of FIG. 10 can be modified in various ways. As one variation, particle coatings 106 can be formed directly on support particles 104 after support-particle aggregates 114 have bonded together to form solid porous film 118. That is, no precursor to particle coatings 106 is utilized. With the stage shown in FIG. 10*c* thereby having been eliminated, the process sequence jumps from the stage of FIG. 10*b* to the stage of FIG. 10*d*.

The back-end process sequence of FIG. 11 is another variation of the process sequence of FIG. 10. In the back-end sequence of FIG. 11, precursor material 122 is formed over support particles 104 of fractal support-particle aggregates 114 while aggregates 114 are still in colloidal composition 110. See FIG. 11*a*. This operation can be implemented by introducing the desired basic particle-coating precursor into composition 110 after aggregates 114 have been formed.

Figure 11A:
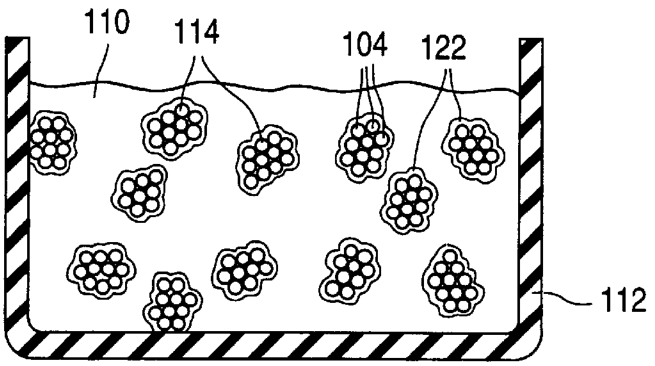
FIGS. 11*a*–11*d* are cross-sectional side views representing another set of steps that employ the invention's teachings for creating a porous layer from the particle aggregates in FIG. 9*b* so that the particle aggregates appear generally as shown in FIG. 8*a*.
Figure 11B:
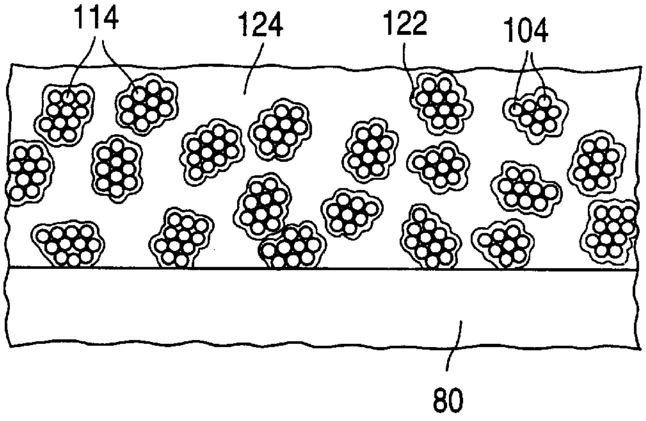

A pair of largely identical portions 124 of so-modified colloidal composition 110 are provided on the opposite faces of core substrate 80. FIG. 11*b* shows one of portions 124. Each portion 124 is a relatively thin liquidous colloidal film-like body having largely the same characteristics as each colloidal film 116 except that precursor material 122 covers support particles 104 of each aggregate 114 in each colloidal film 124. Any of the techniques utilized to form films 116 in the process sequence of FIG. 10 can be employed to form films 124 in the process sequence of FIG. 11.

Colloidal films 124 are processed in substantially the same way in later operations. Only one of films 124 is, for simplicity, dealt with in the remainder of the process description for FIG. 11.

Figure 11C:
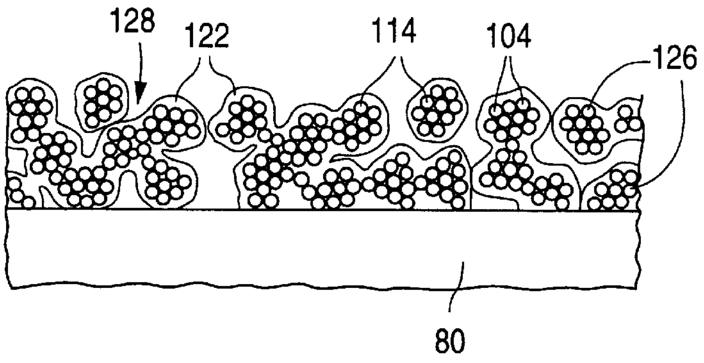

Particle aggregates 114, as coated with precursor material 122 in illustrated colloidal film 124, are now caused to bond together in an open manner to form a solid film-like porous body 126 as shown in FIG. 11*c*. Irregular pores 128 extend between precursor-coated bonded aggregates 114. Similar to the process sequence of FIG. 10, heat can be applied to promote the bonding of precursor-coated particle aggregates 114 to one another. The aggregate bonding action can also be promoted through changes in the pH and/or ionic strength of precursor-containing colloidal composition 110, the precursor to colloidal film 124. The liquid in colloidal film 124 is also removed. The liquid removal can be performed by drying the structure of FIG. 11*b* at approximately room temperature. Heat can alternatively or additionally be used to remove the liquid provided that the heat does not cause precursor material 122 to change chemical form in an undesired way.

Precursor material 122 in the process sequence of FIG. 11 is now converted into particle coatings 106. See FIG. 11*d* in which precursor-coated support particle aggregates 114 have again become fractal coated-particle aggregates 100, coated solid porous film 126 has become solid porous layer 82, pores 128 have become pores 58, and the portion of the particle coating material along rough face 54 has again become conformal coating 88. The conversion of precursor material 122 into particle coatings 106 is typically achieved by heating material 122. The heating step is performed in the way prescribed above for the process sequence of FIG. 10.

Figure 11D:
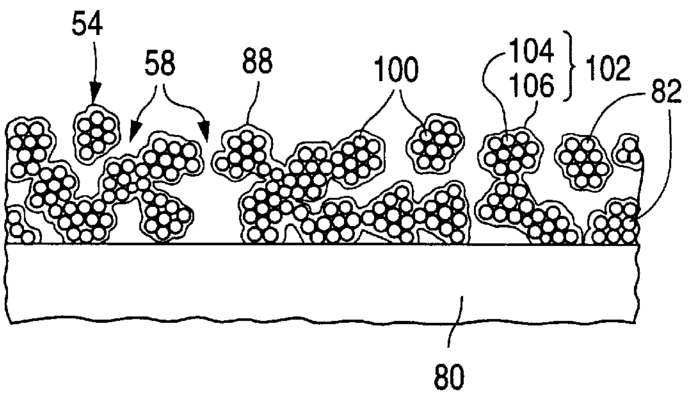

Porous layer 82 in FIG. 11*d* is very similar to porous layer 82 in FIG. 10*d*. The only notable difference is that the bonding of support-particle aggregates 114 to one another in FIG. 11*d* may occur through particle coatings 106 because precursor material 122 in the process sequence of FIG. 11 is formed over support-particle aggregates 114 before they have bonded together rather than after they have bonded together as occurs in the process sequence of FIG. 10. Each fractal aggregate 100 of porous body 82/88 in FIG. 11*d* appears largely as depicted in FIG. 8*a*.

The process sequence of FIG. 11 can be modified in various ways. As one variation, the removal of the liquid in colloidal composition 124 and the conversion of precursor material 122 into particle coatings 106 can be performed partially or fully simultaneously. The stage of FIG. 11*c* may then be deleted. As another variation, the basic particle-coating precursor, or a catalyst that causes the basic particle-coating precursor to accumulate over support particles 104, can be supplied directly to colloidal film 124 rather than to composition 110. In this case, the formation of precursor material 122 on support particles 104 and the bonding of support-particle aggregates 114 to form solid porous film 126 may occur partially or fully simultaneously.

FIGS. 12*a*–12*d* (collectively "FIG. 12") depict a process for manufacturing a structure such as main wall 46 in which composite porous body 82/88 is formed with fractal aggregates 100 of the type depicted in FIG. 8*b*. The process of FIG. 12 begins with a liquidous colloidal composition 130 provided in container 112. See FIG. 12*a*. Colloidal composition 130 consists of coated particles 102 and a suitable liquid in which particles 102 are suspended. As FIG. 12*a* indicates, each coated particle 102 here consists of support particle 104 and particle coating 108. Any tendency that coated particles may have to precipitate and accumulate on the bottom of container 112 can be inhibited by mixing a suitable additive into composition 130 or/and appropriately agitating container 112.

Figure 12A:
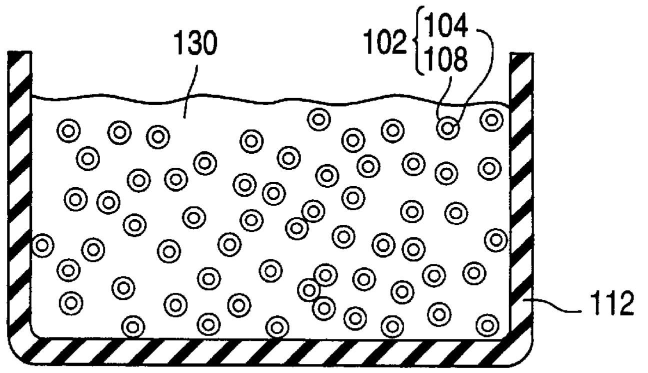
FIGS. 12*a*–12*d* are cross-sectional side views representing a set of steps that utilize the invention's teachings for creating a porous layer of particle aggregates that appear generally as shown in FIG. 8*b*.

Various techniques can be employed to form particle coatings 108 over support particles 104 in one or more processing steps that precede the stage shown in FIG. 12*a*. For example, support particles 104 and the material intended to form particle coatings 108 can be combined with a liquid. By appropriately choosing support particles 104, the particle coating material, and the liquid, the coating material accumulates over support particles 104 to form coated particles 102. As the coating material accumulates over support particles 104, chemical reactions may occur to strengthen bonding of particle coatings 108 to support particles 104. One or more suitable additives can be mixed into the liquid to promote the coating action. Changes in the pH and/or ionic strength of the liquid can also be utilized to promote the coating action. The liquid may be the liquid of colloidal composition 130. If not, coated particles 102 are subsequently transferred to the liquid of composition 130.

Alternatively, support particles 104 and a basic precursor to the particle-coating material can be combined with a liquid to form a liquidous colloidal composition. The basic particle-coating precursor accumulates over support particles 104 and undergoes suitable bonding that converts the particle-coating precursor into particle coatings 108. The conversion of the particle-coating precursor into coatings 108 can be initiated or promoted by heating the colloidal composition. One or more additives can be introduced into the colloidal composition to promote the coating formation. Changes in the pH and/or ionic strength of the colloidal composition can also be employed to promote the coating formation. If the liquid is not the liquid of colloidal composition 130, coated particles 102 can be subsequently transferred to the liquid of composition 130.

Figure 12B:
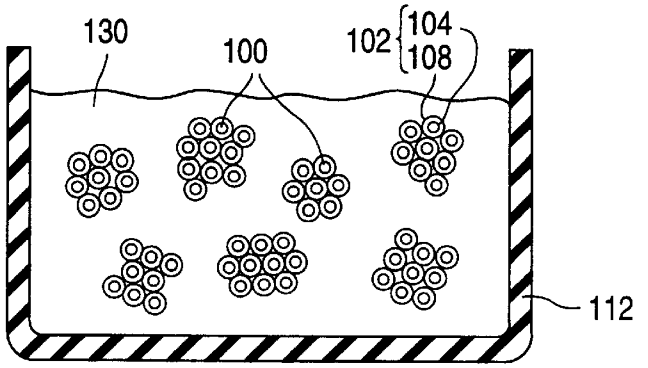

Having reached the stage of FIG. 12*a*, coated particles 102 are induced to bond together in groups to form fractal coated-particle aggregates 100 in colloidal composition 130. FIG. 12*b* illustrates this stage. The aggregation of coated particles 102 to form aggregates 100 can be promoted in various ways. For example, heat can be applied to composition 130. The particle aggregation can also be promoted through changes in the pH and/or ionic strength of composition 130.

Figure 12C:
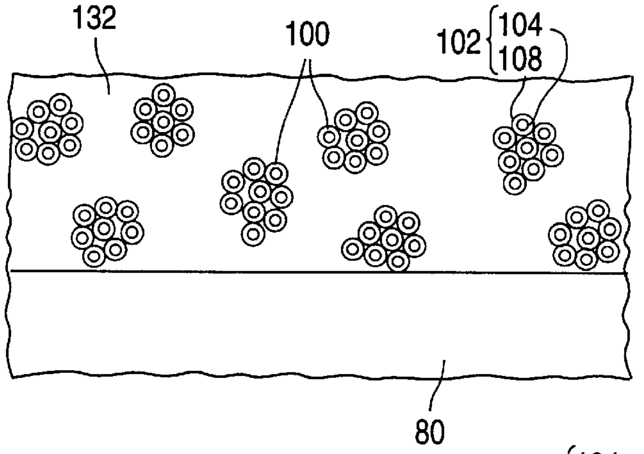

A pair of largely identical portions 132 of colloidal composition 130 are provided on the opposite faces of core substrate. FIG. 12*c* depicts one of portions 132. Each of portions 132 is a relatively thin liquidous colloidal film-like body having largely the same characteristics as each of colloidal films 116 described above, except that particle coatings 108 overlie support particles 104 of aggregates 100 in each colloidal film 132. Any of the techniques utilized to form films 116 in the process sequence of FIG. 10 can be utilized to form films 132 in the process of FIG. 12.

In subsequent operations, colloidal films 132 are processed substantially the same. For simplicity, only one of films 132 is dealt with in the remainder of the process description for FIG. 12.

Figure 12D:
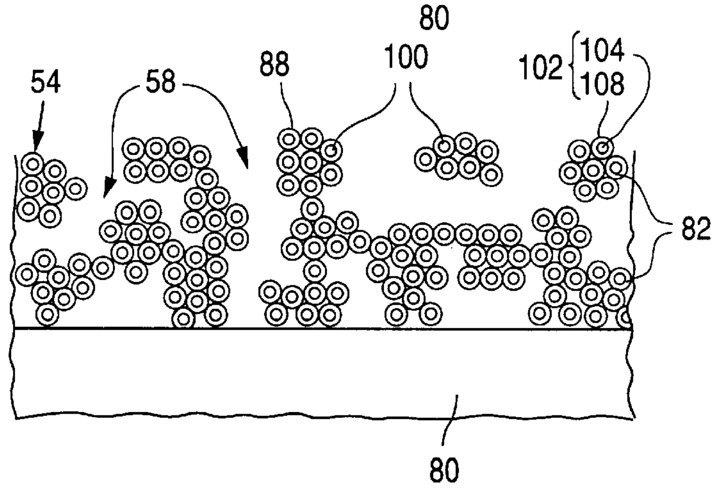

Coated-particle aggregates 100 in illustrated colloidal film 132 are now caused to bond together in an open manner to form solid porous layer 82 as shown in FIG. 12*d*. The aggregate bonding action can be promoted by employing any of the aggregate bonding techniques described above for the process sequences of FIGS. 10 and 11. The liquid in thin film 132 is also removed. The liquid removal can be performed by drying film 132 at approximately room temperature. Alternatively or additionally, heat can be employed in removing the liquid. The portion of the particle coating material along rough face 54 forms conformal coating 88. Each coated-particle aggregate 100 in FIG. 12*d* appears as shown in FIG. 8*b*.

The process of FIG. 12 can be modified in a variety of ways. The formation of particle coatings 108 on support particles 104 and the aggregation of coated particles 102 to form fractal aggregates 100 can occur partially or fully simultaneously. The aggregation of coated particles 102 to form aggregates 100 can occur partially or fully in colloidal film 132 rather than totally in colloidal composition 130.

As indicated above, item 80 (a) in the process of FIG. 12, (b) in the composite process of FIGS. 9 and 11, (c) in the composite process of FIGS. 9 and 10, and (d) in the variations of these processes represents both core substrate 80 of spacer wall 24 and a larger precursor substrate from which two or more of substrates 80 can be made. When item 80 in these processes and process variations represents core substrate 80, the structure in each of FIGS. 10*d*, 11*d*, and 12*d* implements main wall 46. When item 80 in these processes and process variations represents the larger precursor substrate, the structure in each of FIGS. 10*d*, 11*d*, and 12*d* can be cut into multiple portions to form multiple walls 46. In either case, the formation of electrodes 48, 50, and 52 along each wall 46 fabricated according to any of these processes and process variations is integrated with each of these processes and process variations in the manner prescribed above.

Particles 102 in fractal particle aggregates 100 may consist principally of uncoated particles, i.e., particles not having particle coatings that overlie generally distinct support particles, in another implementation of main wall 46. More particularly, aggregates 100 can be formed principally with uncoated particles when total roughness modified electron yield coefficient $\sigma^*$ is sufficiently low for such aggregates 100. The uncoated particles of aggregates 100 may, for example, be constituted largely the same as support particles 104.

The fabrication of the present flat-panel display, including spacer walls 24, in the uncoated particle variation is conducted in the manner described above for the coated-particle embodiments except that the steps involved in forming particle coatings over support particles are omitted. In the revised fabrication process, suitable uncoated particles are induced to bond together in groups to form respective fractal aggregates 100 of uncoated particles. Fractal aggregates 100 are then caused to bond together in an open manner over core substrate 80 to form layer-shaped porous body 82. The resultant structure is then utilized in one or more of main walls 46.

While the structure of each of FIGS. 10*d*, 11*d*, and 12*d* is particularly suitable for partial or full use in spacer wall 24, each of these structures can be employed in other applications. As an example, the structure of FIG. 10*d*, 11*d*, or 12*d* can be utilized as a catalyst or in a high-surface-area chemical gas sensor. The same occurs when fractal aggregates 100 are principally formed with uncoated particles.

Main Spacer Wall Having Carbon-Containing Coating

Figure 13:
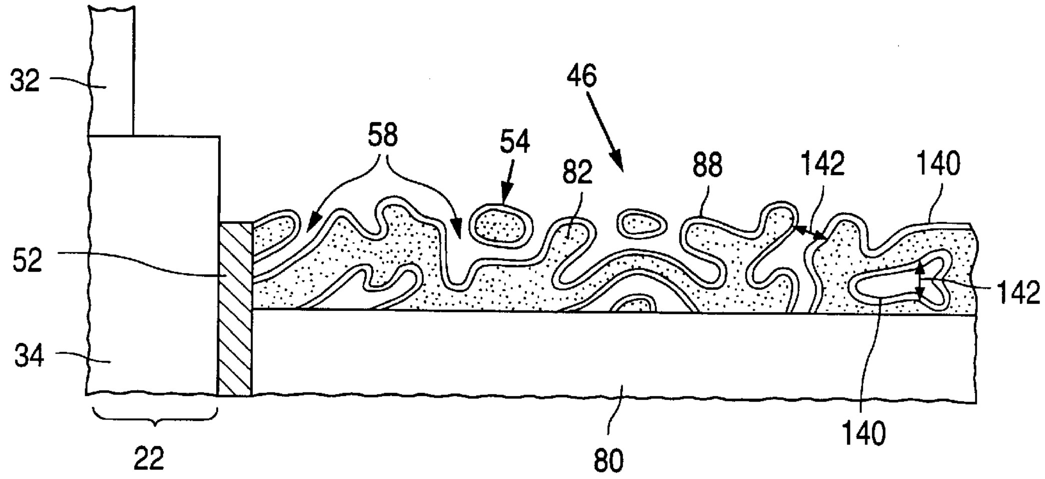
FIG. 13 is a cross-sectional view of a section of the display portion in FIG. 2 in which one porous layer in the main spacer wall of FIG. 5*c* is implemented with a carbon-coated porous body according to the invention.

FIG. 13 illustrates another embodiment of a portion of main spacer wall 46 along rough face 54, and an adjoining portion of faceplate structure 22. The embodiment of FIG. 13 implements the structure of FIG. 5*c* for the situation in which conformal coating 88 consists principally of carbon. Hence, carbon-containing coating 88 is normally of lower total natural electron yield coefficient a than underlying porous layer 82. Coating 88 in FIG. 13 is part of a multi-part carbon-containing coating 140 that defines (a) the pore surfaces along coating 88 and (b) the surfaces of pores 58 situated fully below face 54.

More particularly, irregular primary pores 142 are randomly distributed throughout porous layer 82 in FIG. 13. Some of primary pores 142 are situated along rough face 54 and thus are externally accessible. Others of ores 142 are fully enclosed by the porous body formed with core substrate 80, porous layer 82, and porous layer 84 (not shown), and thus are externally inaccessible. The average diameter of primary pores 142 is normally 5–1,000 nm, preferably 5–200 nm.

Carbon-containing coating 140 overlies the surfaces of substantially all of primary pores 142, including those that are externally inaccessible, thereby respectively converting pores 142 into pores 58, referred to here as further pores. Conformal coating 88 consists of the portion of carbon-containing coating 140 situated along the externally accessible ones of primary pores 142. Due to the presence of coating 140, the average diameter of further pores 58 is less than the average diameter of primary pores 142. The minimum average diameter of further pores 58 is typically 1 nm. Depending on the thickness of coating 140, the maximum average diameter of further pores 58 is typically in the vicinity of 1,000 nm, preferably in the vicinity of 200 nm. Porous layer 82 in FIG. 13 has the above-described porosity characteristics. Hence, the minimum porosity along layer 82 is normally at least 10%.

Carbon-containing coating 140, including conformal coating 88, is normally more than 50% carbon. The percentage of carbon in coating 140 is typically at least 80%. The carbon in coating 140 is normally substantially all amorphous carbon. Alternatively, coating 140 may consist substantially of diamond-like carbon or a combination of amorphous carbon and diamond-like carbon.

Carbon-containing coating 140 normally has a thickness of 1–100 nm, preferably 5–50 nm. The thickness of coating 140 is normally highly uniform. The standard deviation in the thickness of coating 140 is normally no more than 20%, preferably no more than 10%, of the average coating thickness. By achieving this thickness uniformity, coating 140 can be made quite thin without exposing a significant portion of porous layer 82 and thus increasing the secondary electron emission from main wall 46 due to fact that layer 82 is normally of higher total natural electron yield coefficient $\sigma$ than coating 140. In turn, making coating 140 thin reduces the power dissipation in main wall 46.

Figure 14A:
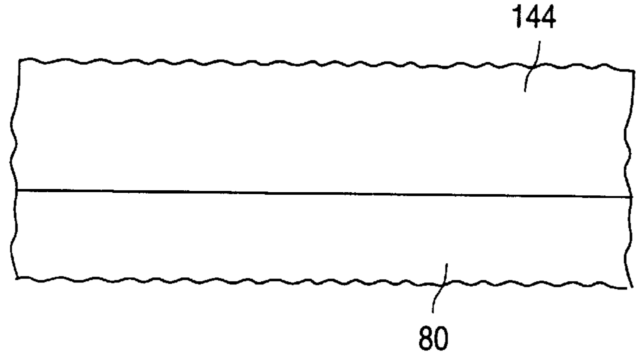
FIGS. 14*a*–14*c* are cross-sectional side views representing a set of steps that employ the invention's teachings for creating a carbon-coated porous layer suitable for partial or full use in the main spacer wall of FIG. 13.
Figure 14B:
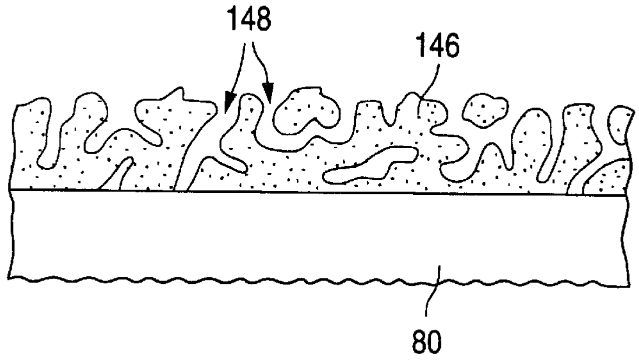
Figure 14C:
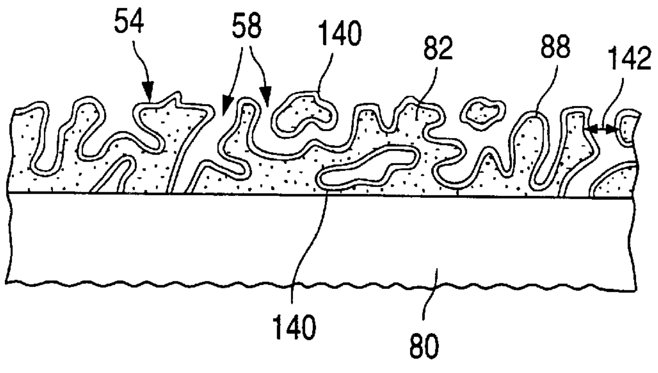

FIGS. 14*a*–14*c* (collectively "FIG. 14") depict a process for manufacturing a structure such as main wall 46 in which conformal coating 88 is part of carbon-containing coating 140. The starting point for the process of FIG. 14 is a substructure consisting of core substrate 80. A pair of largely identical layers 144 of a liquidous composition of a carbon-containing ceramic precursor and a suitable liquid are formed on the opposite faces of core substrate 80. FIG. 14*a* depicts one of precursor-containing liquidous layers 144.

As described further below, each molecule of the carbon-containing ceramic precursor material in liquidous layers 144 contains multiple carbon-containing groups, one or more of which are readily retainable during cross-linking of the precursor material and one or more of which are readily releasable during the precursor cross-linking. The molecules of the ceramic precursor material thus provide both a cross-linking capability and serve as a source of carbon when the cross-linking is complete.

Subject to providing the foregoing dual-function capability, the ceramic precursor material is normally an organically modified precursor in which the retainable and releasable carbon-containing groups are organic groups. The cross-linking of the organically modified ceramic precursor is typically a polymerization reaction. The organically modified precursor may contain metalorganic material in which there are metal-oxygen-carbon bonds or/and organometallic material in which there are direct metal-carbon bonds.

The metallic cations in the precursor material consist of one or more non-carbon elements in Groups 3b, 4b, 5b, 6b, 7b, 8, 1b, 2b, 3a, and 4a in Periods 2–6 of the Periodic Table, including the lanthanides. As with thin films 92, particularly attractive ceramic cation candidates for the precursor material in layers 144 are silicon, titanium, vanadium, chromium, manganese, iron, germanium, yttrium, zirconium, niobium, molybdenum, tin, cerium, praseodymium, neodymium, europium, and tungsten. Two or more of these metallic cation candidates may be present in the precursor material, typically in mixed form.

More particularly, the ceramic precursor material can be constituted as described above for the ceramic precursor used in forming thin films 92 as gels in the process of FIG. 6. Candidates for the ceramic precursor material in liquidous layers 144 include metallic alkoxides having both retainable and releasable carbon-containing groups or/and other compounds having both retainable and releasable carbon-containing groups. In a typical implementation, the metallic cations are silicon. The precursor material consists of alkylalkoxysilane having both retainable and releasable organic groups.

The liquid in precursor-containing liquidous layer 144 is normally an organic solvent. Examples of the organic solvent include alcohols such as ethanol and isopropanol, ketones such as acetone and methylisobutylketone, and polyols such as ethylene glycol. The solvent may also contain other organic room-temperature liquids in which the precursor material is miscible. When the precursor material is alkylalkoxysilane, the liquid is typically an alcohol such as ethanol.

Each precursor-containing liquidous layer 144 is normally formed to a thickness of 10 nm–10 $\mu$m on core substrate 80. Any of the above-described dipping, spraying, deposition/spinning, and vapor-condensation techniques utilized to create thin films 92 can be employed to form liquidous layers 144. Likewise, the formation of layers 144 can be performed in a homogeneous or heterogeneous manner. Each layer 144 may be formed in one or more coating steps.

Precursor-containing liquidous layers 144 are processed in substantially the same way in later operations. Only one of layers 144 is, for simplicity, dealt with in the remainder of the process description for FIG. 14.

Molecules of the organic precursor material in illustrated precursor-containing liquidous layer 144 cross-link to form a layer-like initial porous body 146 as shown in FIG. 14*b*. Various mechanisms such as use of a catalyst, changes in pH, changes in ionic strength, or/and heating can be employed to promote the cross-linking. The liquid in liquidous layer 144 is also removed. The liquid removal can be performed by drying layer 144 at approximately room temperature. Alternatively or additionally, heat can be employed to remove the liquid provided that the heat does not cause undesired chemical reactions to occur. Part of the liquid is typically a byproduct of the cross-linking action.

The cross-linking and liquid removal can be performed according to a sol-gel process of the type described above in connection with the process of FIG. 6. In being converted to initial porous layer 146, precursor-containing liquidous layer 144 then goes through a gel stage. Liquid is removed from the film-like gel without causing the cross-linked precursor material to fully collapse and fill the space previously occupied by the liquid. As a result, porous layer 146 contains randomly distributed irregular initial pores 148. The average diameter of initial pores 148 is normally 1–1,000 nm, preferably 1–200 nm.

During the precursor-material cross-linking, some of the carbon-containing, normally organic, groups of 10 the precursor molecules undergo chemical reactions and are released from the cross-linked material. The released carbon-containing groups dissolve in the liquid or/and become part of the liquid. Importantly, some of the carbon-containing groups of the precursor molecules are retained in the cross-linked material. The ends of the retained carbon-containing groups generally tend to move into the liquid. Consequently, retained carbon-containing groups extend along the surfaces of initial pores 148 when the cross-linking and liquid removal are complete. In particular, the surfaces of pores 148 are largely formed by retained carbon-containing groups of the precursor molecules.

Initial porous layer 146 is now treated to remove non-carbon constituents of at least the retained carbon-containing groups along initial pores 148. FIG. 14*c* depicts the resultant structure in which porous layer 146 has been converted into porous layer 82 and overlying multi-part carbon-containing coating 140. Pores 148 have been respectively converted into further pores 58. Due to the removal of the non-carbon constituents along pores 148, further pores 58 are somewhat larger than initial pores 148. The portion of carbon-containing coating 140 along rough face 54 forms conformal coating 88. During the treatment to remove non-carbon constituents of retained carbon-containing groups, some cross-linking occurs to form bonds among the remaining carbon atoms.

The treatment to remove the non-carbon material along initial pores 148 can be performed in various ways. For example, initial porous layer 146 can be heated to pyrolize the retained carbon-containing, normally organic, groups. The pyrolysis is normally performed in a vacuum or other non-reactive environment such as nitrogen or/and inert gas. The pyrolysis temperature is normally 200–900° C., typically 250–500° C. Alternatively or additionally, layer 146 can be subjected to a plasma, an electron beam, ultraviolet light, or/and a reducing atmosphere, such as a mixture of hydrogen and nitrogen, to remove the non-carbon material along pores 148.

In the structure of FIG. 14*c*, porous layer 82 normally consists principally of oxide of one or more of the metals and metal-like elements used in precursor-containing liquidous layer 144. Related metallic hydroxide may also be present in layer 82. Because the minimum diameter of pores 148 was 1 nm, the minimum diameter of pores 58 is approximately 5 nm here.

Figure 15A:
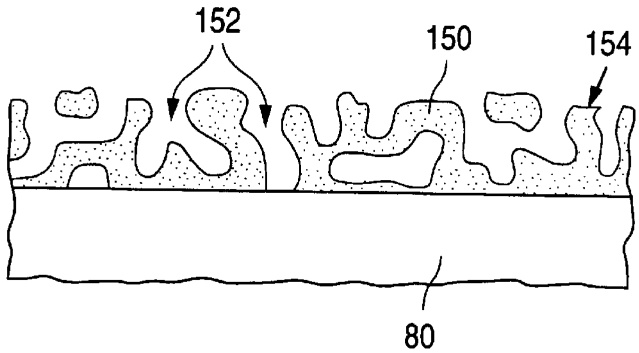
FIGS. 15*a*–15*c* are cross-sectional side views representing a set of steps that employ the invention's teachings for creating a carbon-coated porous layer suitable for full or partial use in the main spacer wall of FIG. 5*c*.
Figure 15B:
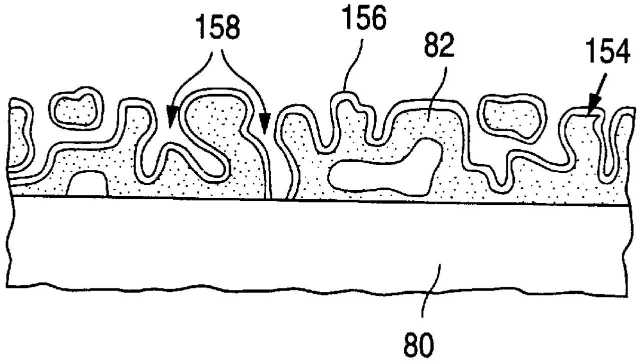
Figure 15C:
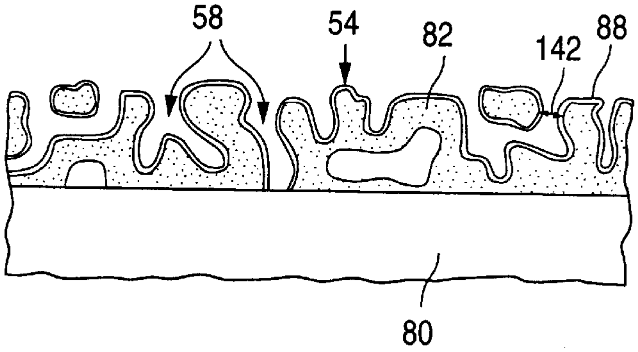

FIGS. 15*a*–15*c* (collectively "FIG. 15") depict another process for manufacturing a structure such as main wall 46 in which conformal coating 88 consists principally of carbon. The process of FIG. 15 begins with a substructure consisting of core substrate 80. A pair of largely identical primary solid layer-like porous bodies 150 are formed along the opposite faces of core substrate 80. FIG. 15*a* depicts one of primary porous layers 150.

Primary porous layers 150 are created in the same way as porous layers 82 in the process of FIG. 6. Irregular primary pores 152 are randomly distributed throughout each porous layer 150. The average diameter of primary pores 152 is normally 5–1,000 nm. The combination of core substrate 80 and porous layers 150 forms a primary structural body in which layers 150 have the porosity characteristics prescribed above for main wall 46. The minimum porosity of each layer 150 is normally at least 10%.

Each solid porous layer 150 normally consists principally of oxide or/and hydroxide of one or more non-carbon elements in Groups 3b, 4b, 5b, 6b, 7b, 8, 1b, 2b, 3a, and 4a of Periods 2–6 of the Periodic Table, again including the lanthanides. As in the process of FIG. 6, particularly attractive candidates for the metallic cations of the material in layers 150 are silicon, titanium, vanadium, chromium, manganese, iron, germanium, yttrium, zirconium, niobium, molybdenum, tin, cerium, praseodymium, neodymium, europium, and tungsten. Two or more of these cation candidates may be present in each layer 150, typically in mixed form. A hydroxyl layer typically extends along primary pores 152 to form their surfaces.

In subsequent steps, porous layers 150 are processed in substantially the same way. For simplicity, only one of layers 150 is dealt with in the remainder of the process description for FIG. 15.

Illustrated porous layer 150 has a rough face 154. Carbon-containing chain molecules are brought into contact with layer 150, including the surfaces of primary pores 152 along face 54. Each carbon-containing chain molecule has one or more carbon-containing chains, normally organic, and one or more leaving species. Each leaving species is normally hydrolyzable, and each carbon-containing chain is normally non-hydrolyzable. The chain molecules have an average chain length of 1–100 nm, preferably 2–20 nm. When a chain molecule has two or more carbon-contaning chains, the chain length of the molecule is the sum of the lengths of the molecule's carbon-containing chains.

The chain molecules chemically bond to porous layer 150, including the surfaces of primary pores 150 along rough face 54, by reactions that largely only involve the leaving species to produce a very thin carbon-containing film 156 along face 54. See FIG. 15*b*. Layer 150 is thereby converted into porous layer 82 as primary pores 152 are respectively converted into irregular intermediate pores 158. Due to the presence of carbon-containing film 156, intermediate pores 158 are slightly smaller than primary pores 152. Since the retained carbon-containing groups are normally organic groups, carbon-containing film 156 is normally an organic film.

The chemical bonding of the carbon-containing chain molecules to porous layer 150 normally occurs by hydrolysis of the leaving species. Specifically, the chain molecules normally bond to oxygen atoms of the hydroxyl layer typically provided along rough face 54 as hydrogen atoms and one or more leaving species of each chain molecule are released. The released hydrogen atoms and leaving species at least form water.

Alternatively, rough face 154 may be formed by a layer of oxygen atoms. The thickness of the oxygen layer is normally no more than approximately a monolayer of oxygen atoms. The oxygen layer forms oxide with the underlying metallic atoms of porous layer 150. To create the oxygen layer, a rough face of a precursor to porous layer 150 is exposed to oxygen. The carbon-containing chain molecules bond directly to the oxygen layer without significant hydrogen release.

Prior to being bonded to primary porous layer 150, each carbon-containing chain molecule is generally representable as:

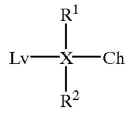

where, X is a multivalent coupling atom, Lv is a leaving species, Ch is a carbon-containing, normally organic, chain having at least three carbon atoms, and each of $R_1$ and $R_2$ is a further species. Multivalent coupling atom X has a valence of at least two. As discussed below, but not indicated in the preceding chain molecule representation, the valence of coupling atom X can be up to seven.

Each of species $R_1$ and $R_2$ is (a) nothing, (b) a leaving species, (c) an alkyl or alkoxy group having up to two carbon atoms, (d) a carbon-containing, normally organic, chain having at least three carbon atoms, or (e) a non-carbon species including a hydrogen or deuterium atom. The word “nothing” as used here in connection with species $R_1$ or $R_2$ means that species $R_1$ or $R_2$, while included in the foregoing representation of the chain molecule, is not actually present in the molecule. Inasmuch as species $R_1$ or $R_2$ can be a leaving species or a carbon-containing chain, multivalent coupling atom X can be chemically bonded to (a) one leaving species and one carbon-containing chain, (b) one leaving species and two carbon-containing chains, (c) two leaving species and one carbon-containing chain, (d) one leaving species and three carbon-containing chains, (e) two leaving species and two carbon-containing chains, or (f) three leaving species and one carbon-containing chain.

Multivalent coupling atom X is typically tetravalent. In this case, only bonding arrangements (d) one leaving species and three carbon-containing chains, (e) two leaving species and two carbon-containing chains, and (f) three leaving species and one carbon-containing chain apply to coupling atom X. Tetravalent candidates for coupling atom X include silicon, titanium, germanium, zirconium, tin, and lead. Aluminum and iron are trivalent candidates for coupling atom X for which bonding arrangements (b) one leaving species and two carbon-containing chains and (c) two leaving species and one carbon-containing chain are applicable. In the trivalent case, only one of species $R_1$ and $R_2$ is present. Neither of species $R_1$ and $R_2$ is present when coupling atom X is bivalent. When porous layer 150 consists of metal oxide of the above described type, preferably with a hydroxyl surface layer, coupling atom X is preferably one of silicon, titanium, and iron.

Each leaving species is normally a halogen atom, an alkoxy group, an acetoxy group, an amine group, a hydroxyl group, or a hydrogen or deuterium atom provided that neither of species $R_1$ and $R_2$ is a hydrogen or deuterium atom. Candidates for the halogen atom as a leaving species are fluorine, chlorine, bromine, and iodine. In cases where multiple leaving species are bonded to coupling atom X, the leaving species can be the same or different.

Each carbon-containing chain is normally an aliphatic group, an aromatic group, a vinyl group (with a double carbon-carbon bond), a mercapto/thio group (with sulfur bonded to an alkyl group), an amine group (with nitrogen bonded to an alkyl group), a methacryloxypropyl group, or a glycidoxypropyl group. Suitable examples of aliphatic and aromatic groups respectively are alkyl and phenyl groups. In cases where multiple carbon-containing chains are bonded to coupling atom X, the carbon-containing chains can be the same or different.

When species $R_1$ or $R_2$ is a non-carbon group, the non-carbon group does, of course, not contribute to the carbon eventually produced in conformal coating 88. However, implementing species $R_1$ or $R_2$ with a non-carbon group in the form of a hydrogen or deuterium atom yields a relatively simple carbon-containing chain molecule. Also, in some situations, it may be desirable for the chain molecules to provide a capability besides a carbon source. This additional capability can be achieved by appropriately choosing a suitable non-carbon group for species $R_1$ or $R_2$.

Although not indicated in the preceding representation of the initial form of each carbon-containing chain molecule, up to three additional species $R_n$, where n is a positive integer other than 1 or 2, may be bonded to coupling atom X prior to the step in which the chain molecules bond to porous layer 150. For instance, there may be (a) one additional species $R_3$, atom X then being pentavalent, (b) two additional species $R_3$ and $R_4$, atom X then being hexavalent, or (c) three additional species $R_3$, $R_4$, and $R_5$, atom X then being heptavalent.

Each additional species $R_n$ is constituted the same as species $R_1$ or $R_2$. Letting each carbon-containing chain molecule be further represented as having up to three additional species $R_n$ bonded to atom X, each additional species $R_n$ thus is (a) nothing, (b) a leaving species, (c) an alkyl or alkoxy group having up to two carbon atoms, (d) a carbon-containing, normally organic, chain having at least three carbon atoms, or (e) a non-carbon species including a hydrogen or deuterium atom. Since each additional species $R_n$ can be a leaving species or a carbon-containing chain, the number of permutations of leaving species and carbon-containing chains is considerably more than that described above in connection with species $R_1$ and $R_2$.

In a typical implementation, each carbon-containing chain molecule is a chlorosilyl species, a dichlorosilyl species, a chloroalkoyysilyl species, or a dichloroalkoyysilyl species as represented below:

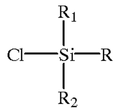

Chlorosilyl

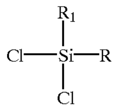

Dichlorosilyl

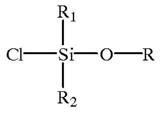

Chloroalkoxysilyl

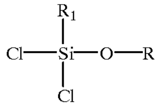

Dichloroalkoxysilyl where species R is a hydrocarbon group having at least three carbon atoms. The hydrocarbon group may be an alkyl group or an aromatic group. The R or O—R group is an organic chain. Species $R_1$ or $R_2$ here is a hydrogen (or deuterium) atom or an alkyl group having up to two carbon atoms. The alkyl group here is typically a methyl group. Each chlorine atom is a leaving species.

In another typical implementation, each organic chain molecule is a chlorotitanyl species, a dichlorotitanyl species, a chloroalkoxyltitanyl species, or a dichloroalkoxytitanyl species. The representations of the chlorotitanyl, dichlorotitanyl, chloroalkoxyltitanyl, and dichloroalkoxytitanyl species are respectively the same as the preceding representations for the chlorosilyl, dichlorosilyl, chloroalkoxysilyl, and dichloroalkoxysilyl species except that a titanium atom replaces each silicon atom. Further candidates for the chain molecules are presented in Arkles, "Silicon, Germanium, Tin, and Lead Compounds, Metal Alkoxides, Diketonates and Carboxylates, A Survey of Properties and Chemistry," 2d ed., Gelest, Inc., 1998, the contents of which are incorporated by reference herein.

Various techniques can be employed to bring the carbon-containing chain molecules into contact with solid porous layer 150. A vapor of the chain molecules can be exposed to layer 150. The chain molecules can be directly sprayed on layer 150. Any liquid which is produced during the bonding reaction and which is not volatized is removed in the course of the vapor exposure or spraying procedure.

The carbon-containing chain molecules can also be combined with a liquid to form a liquidous composition. Porous layer 150 can then be dipped in the liquidous composition. Alternatively, a portion of the liquidous composition can be sprayed on layer 150. Yet further, a portion of the liquidous composition can be deposited on layer 150 and, as necessary, spun to achieve a relatively uniform thickness. The liquid in the portion of the liquidous composition along rough face 54 is subsequently removed, typically by drying at approximately room temperature. Alternatively or additionally, heat can be utilized to remove the liquid provided that the heat does not cause any undesired chemical reactions.

Figure 16:
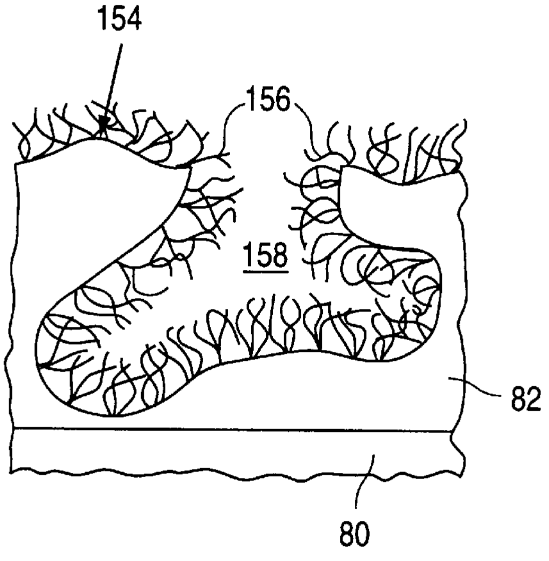
FIG. 16 is an exploded cross-sectional view of part of the porous layer in FIG. 15*c*.

Turning to FIG. 16, it qualitatively presents an exploded view of a portion of the structure of FIG. 15*b*. In the qualitative example of FIG. 16, each bonded chain molecule in carbon-containing film 156 has three carbon-containing chains. As FIG. 16 indicates, the bonded chain molecules of film 156 are distributed in a random manner along rough face 54, including the surface of each intermediate pore 158.

Carbon-containing film 156 is treated to remove the non-carbon constituents of the bonded carbon-containing chain molecules. The resultant structure is depicted in FIG. 15*c* where film 156 has been converted into carbon-containing conformal coating 88. Intermediate pores 158 thereby respectively become further pores 58. Due to the removal of the non-carbon constituents of the chain molecules, further pores 58 are of greater average diameter than intermediate pores 158.

The percentage of carbon in conformal coating 88 here is normally more than 50%, typically at least 80%. The carbon in coating 88 normally is largely all amorphous carbon. During the treatment of film 56 to remove non-carbon constituents of the bonded chain molecules, cross-linking occurs to create carbon-carbon bonds.

The thickness of conformal coating 88 in FIG. 15*c* is normally 1–100 nm, preferably 5–50 nm. As with carbon-containing coating 140/88 in FIG. 13, the thickness of coating 88 in FIG. 15*c* is normally highly uniform. The standard deviation in the thickness of layer 88 in FIG. 15*c* is preferably no more than 20%, more preferably no more than 10%, of the average coating thickness. This thickness uniformity in coating 88 of FIG. 15*c* enables coating 88 to be made quite thin so as to reduce the power dissipation in main wall 46 without significantly exposing underlying porous layer 82 and thereby increasing the secondary electron emission.

The removal of the non-carbon constituents in organic film 156 can be performed in a variety of ways. Film 156 can be heated to pyrolize the bonded organic chain molecules. The pyrolysis is usually done in a vacuum or other non-reactive environment such as nitrogen or/and inert gas. As in the process of FIG. 14, the pyrolysis temperature is normally 200–900° C., typically 250–500° C. Alternatively or additionally, film 156 can be subjected to a plasma, an electron beam, ultraviolet light, or/and a reducing environment to remove the non-carbon constituents of the bonded chain molecules.

In the exemplary process of FIG. 15, carbon-containing film 156 is converted into conformal coating 88 that adjoins porous layer 82. Alternatively, carbon-containing chain molecules may be brought into contact with a separate conformal coating that lies on layer 82. The chain molecules then bond to this conformal coating, rather than to earlier porous layer 150, to form a thin carbon-containing film along the conformal coating. The carbon-containing film is then converted largely to carbon in the manner described above for converting film 156 into carbon. If the conformal coating that adjoins layer 82 is of lower average total natural electron yield coefficient a than layer 82, the conformal coating and the overlying carbon-containing film cooperate with each other to form conformal coating 88 as a multi-layer coating. Alternatively, the conformal coating that adjoins layer 82 can provide a capability other than reducing the total natural electron yield.

If the conformal coating that adjoins 82 in this variation does not have a surface hydroxyl layer, the fabrication of a carbon-containing coating on the lower conformal coating typically entails exposing the lower conformal coating to oxygen to form a surface oxygen layer of no more than approximately a monolayer in thickness. The carbon-containing chain molecules then bond to the oxygen layer in the manner described above for creating organic film 156. Consequently, the carbon-containing film produced from the bonded chain molecules can be processed in the way described above for film 156.

Taking note of the fact that item 80 in the process of each of FIGS. 14 and 15 represents either core substrate 80 or the larger precursor substrate from which multiple substrates 80 can be made, the structure in each of FIGS. 14*c* and 15*c* implements main wall 46 when item 80 represents core substrate 80. When item 80 represents the larger precursor substrate, the structure in each of FIGS. 14*c* and 15*c* can be cut into multiple portions to form multiple walls 46. The formation of electrodes 48, 50, and 52 is integrated with the process of each of FIGS. 14 and 15 in the manner prescribed above.

The structure of each of FIGS. 14*c* and 15*c*, although particularly suitable for partial or full use in spacer wall 24, can be employed in other pplications. For instance, the structure of FIG. 14*c* or 15*c* can be utilized as a catalyst or in a chemical gas sensor of high surface area.

Main Spacer Wall Having Layer with Directional Resistivity Characteristic

Figure 17:
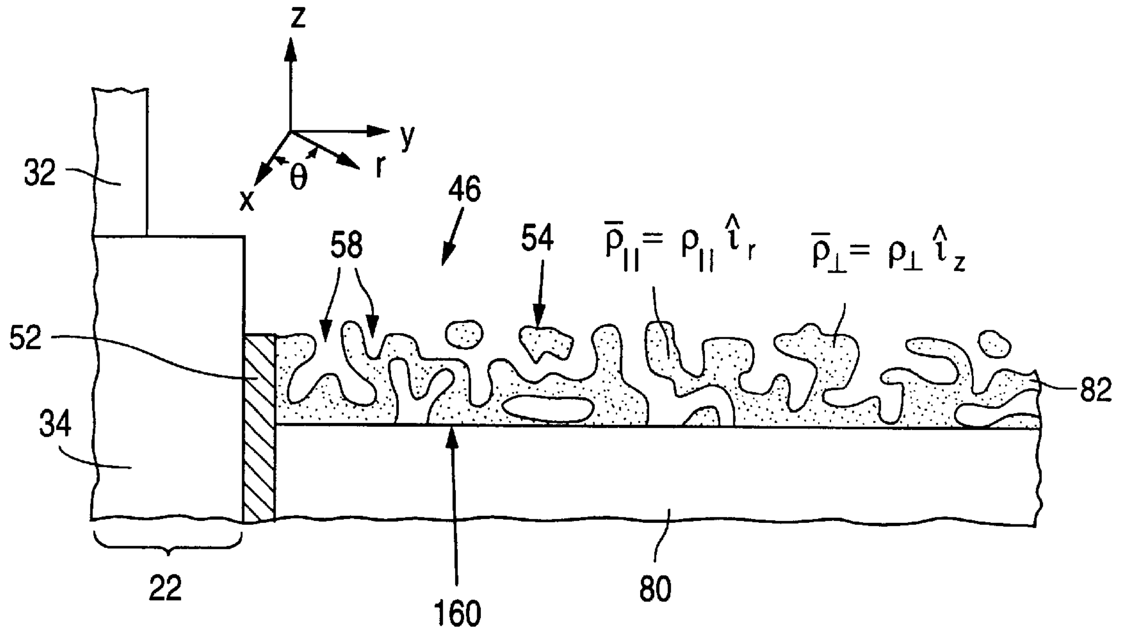
FIG. 17 is a cross-sectional view of a section of the display portion in FIG. 2 in which the main spacer wall of FIG. 5*a* or 5*c* utilizes a layer having a directional electrical resistivity characteristic in accordance with the invention.

FIG. 17 depicts a further embodiment of a portion of main spacer wall 46 along rough face 54, and an adjoining portion of faceplate structure 22. Core substrate 80 of wall 46 here is a support body having a face 160 which is typically relatively smooth but may have some roughness and on which porous layer 82 is situated. In the embodiment of FIG. 17, layer 82 is a substantially unitary primary layer having a directional resistivity characteristic in which the layer's average resistivity parallel to support-body face 160 is greater than the layer's average resistivity perpendicular to face 160. As used here, the term "unitary" means that layer 82, while being porous, is substantially a single piece of material. That is, each part of layer 82 is connected to each other part of layer 82 through material of layer 82.

In order to better understand the directional resistivity characteristic, FIG. 17 is illustrated with respect to a standard xyz coordinate system in combination with an rθz polar coordinate system. The xy plane in the xyz coordinate system extends parallel to an imaginary plane passing generally through support-body face 160. The z coordinate thus extends perpendicular to the plane running through face 160. Radial coordinate r lies in the xy plane. Angular coordinate θ is measured counter-clockwise in the xy plane starting from the x axis.

Porous layer 82 has an average scalar electrical resistivity $\rho_{\parallel}$ parallel to support-body face 160 and thus parallel to the xy and rθ planes. In any direction in the rθ plane, the average vector electrical resistivity $\overline{\rho}_{\parallel}$ of layer 82 approximately equals $\rho_{\parallel}\hat{i}_r$, where $\hat{i}_r$ is a unit vector along radial coordinate r. Layer 82 has an average scalar electrical resistivity $\rho_{\perp}$ perpendicular to face 160 and thus along the z axis. The average vector electrical resistivity $\overline{\rho}_{\perp}$ of layer 82 in the z direction equals $\rho_{\perp}\hat{i}_z$, where $\hat{i}_z$ is a unit vector in the z direction.

With the foregoing in mind, average scalar resistivity $\rho_{\parallel}$ is greater than average scalar resistivity $\rho_{\perp}$. Resistivity $\rho_{\parallel}$ is normally at least twice, preferably at least ten times, resistivity $\rho_{\perp}$. Typically, resistivity $\rho_{\parallel}$ is at least one hundred times resistivity $\rho_{\perp}$. Also, porous layer 82 in FIG. 17 has a sheet resistance of at least $10^{13}$ ohms/sq., preferably at least $10^{14}$ ohms/sq., parallel to support-body face 160. Layer 82 has the porosity characteristics described above. That is, the minimum porosity of layer 82, at least along rough face 54, is 10%.

Figure 18:
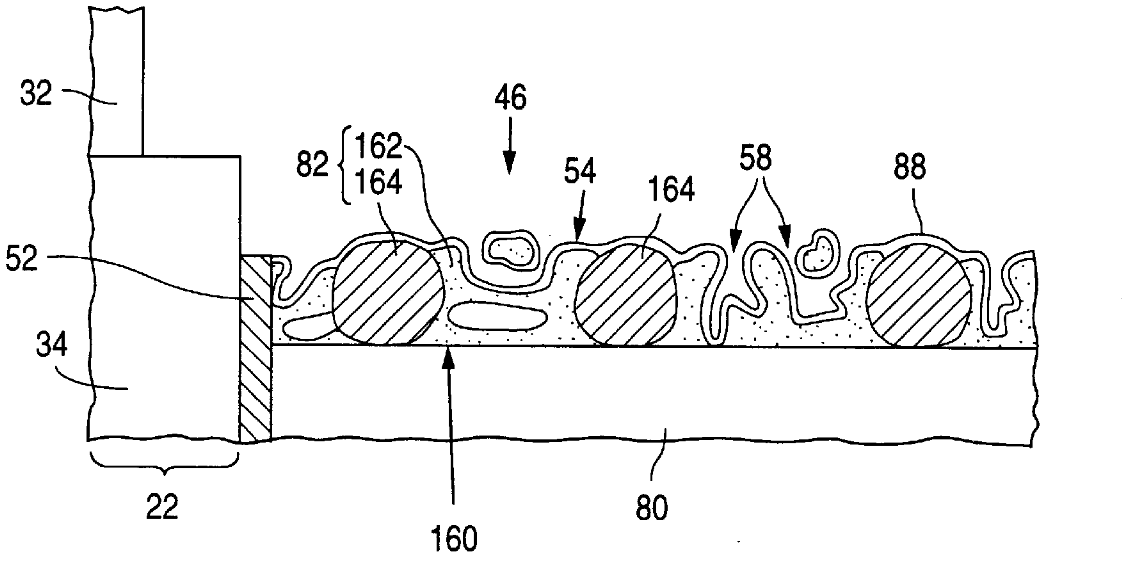
FIG. 18 is a cross-sectional view of an implementation of the display portion in FIG. 17.

FIG. 18 depicts an implementation of the display portion in FIG. 17. In FIG. 18, porous layer 82 consists of an electrically non-conductive base layer 162 and a plurality of electrically non-insulating resistivity-modifying regions 164. Base layer 162 is situated directly on core substrate 80, i.e., the support body. The resistivity-modifying regions 164 occupy laterally separated sites laterally surrounded by base layer 162. Each resistivity-modifying region 164 contacts substrate 80 and extends substantially through base layer 162. Consequently, no more than approximately a monolayer of regions 164 are normally present in layer 82.

The electrical resistivity of base layer 162 is relatively uniform throughout layer 162. The electrical resistivities of resistivity-modifying regions 164 are relatively uniform from one region 164 to another. Importantly, the average resistivity of regions 164 is less than the average resistivity of base layer 162. As a result, average scalar resistivity $\rho_{\parallel}$ exceeds average scalar resistivity $\rho_{\perp}$.

The implementation of FIG. 18 typically includes conformal coating 88 on top of base layer 162 and resistivity-modifying regions 164. When coating 88 is present, the structure of FIG. 18 implements main wall 46 of FIG. 5*c*. Coating 88 in FIG. 18 is normally electrically non-insulating. If coating 88 is absent, the structure of FIG. 18 implements wall 46 of FIG. 5*a*. Regardless of whether coating 88 is present or absent, regions 164 provide electrical paths substantially through layer 164 perpendicular to substrate face 160.

When high-energy primary electrons strike main wall 46 and cause secondary electron emission, the relative low value of average scalar resistivity pi enables the charge that accumulates on the outside of wall 46 due to primary electrons striking wall 46 to be rapidly transferred through porous layer 82 to core substrate 80 and then removed. Although electrons are negatively charged, the charge that accumulates on the outside of wall 46 is normally positive because total roughness-modified electron yield coefficient $\sigma^*$ of the material along rough face 54 is usually greater than 1, i.e., the number of secondary electrons that escape a unit projected area of wall 46 is greater than the number of primary electrons that strike a unit projected wall area and accumulate on the outside of wall 46. The positive charge moves rapidly through porous layer 82 along the electrical paths formed by resistivity-modifying regions 164.

During FED operation, the anode in faceplate structure 22 is maintained at a potential much higher than the potentials of the electron-emissive elements in backplate structure 20. In particular, the anode potential is typically 4,000–10,000 volts higher than the potentials of the electron-emissive elements. The relatively high value of average scalar resistivity $\rho_{\parallel}$ serves to limit the current that flows through porous layer 82 from faceplate structure 22 to backplate structure 20 (or vice versa) due to the high potential difference between plate structures 22 and 20. By reducing the (leakage) current that flows through layer 82 from faceplate structure 22 to backplate structure 20, the FED's power dissipation is reduced, thereby improving the operational efficiency. Damage that might possibly occur to layer 82 due to excessive current that flows from faceplate structure 22 through layer 82 to backplate structure 20 is also avoided.

Additionally, a large majority of the current flowing from faceplate structure 22 through spacer wall 24 to backplate structure 20 flows through core substrate 80. Consequently, substrate 80 substantially provides a current path between plate structures 22 and 20 while porous layers 82 and 84 serve to avoid charge buildup on spacer wall 24. This separation of functions facilitates spacer design.

The electrically non-conductive material of base layer 162 is preferably electrically resistive. Subject to this limitation, layer 162 is normally formed with any of the materials described above for porous layer 82 in the process of FIG. 6. These materials include oxides and hydroxides of one or more non-carbon elements in Groups 3b, 4b, 5b, 6b, 7b, 8, 1b, 2b, 3a, and 4a of Periods 2–6 of the Periodic Table, including the lanthanides. For layer 162, particularly attractive oxides and hydroxides are those of silicon, titanium, vanadium, chromium, manganese, iron, germanium, yttrium, zirconium, niobium, molybdenum, tin, cerium, praseodymium, neodymium, europium, and tungsten, including oxides and hydroxides of two or more of these elements typically in mixed form.

Resistivity-modifying regions 164 are typically roughly spherical but can have other shapes. The average diameter of regions 164 is normally 5–500 nm, typically 50–200 nm. On the average, regions 164 typically protrude 5–50% (of the way) out of base layer 162.

Resistivity-modifying regions 164 preferably are electrically conductive. In a typical implementation, regions 164 consist principally of electrically conductive carbon. The percentage of carbon in regions 164 is normally more than 50%, preferably at least 80%. The carbon in regions 164 is normally in the form of one or more of amorphous carbon, graphite, and diamond or diamond-like carbon.

Conformal coating 88 in FIG. 18 is also preferably electrically conductive. In a typical implementation, coating 88 here consists principally of electrically conductive carbon. The percentage of carbon in coating 88 is normally more than 50%, preferably at least 80%. The carbon in coating 88 is normally substantially all amorphous carbon or/and diamond-like carbon.

Figure 19A:
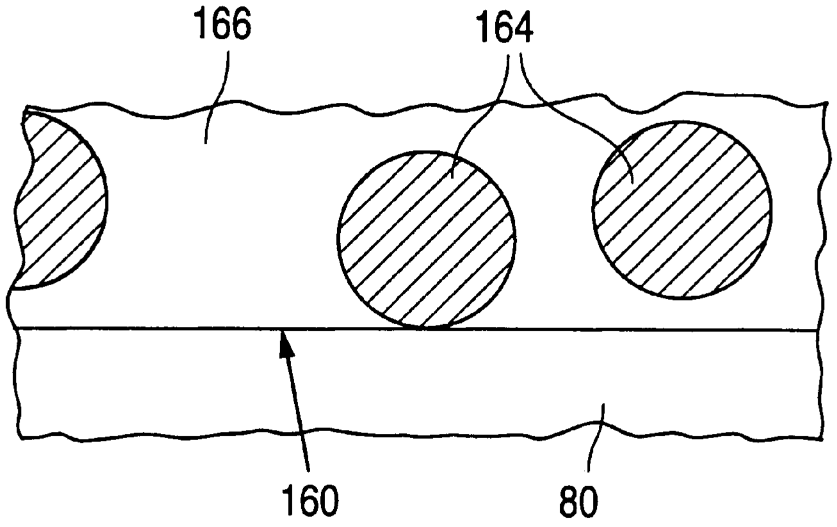
FIGS. 19*a*–19*c* are cross-sectional side views representing a set of steps that employ the invention's teachings for creating a porous layer which has a directional resistivity characteristic and which is suitable for partial or full use in the main spacer wall of FIG. 17.
Figure 19B:
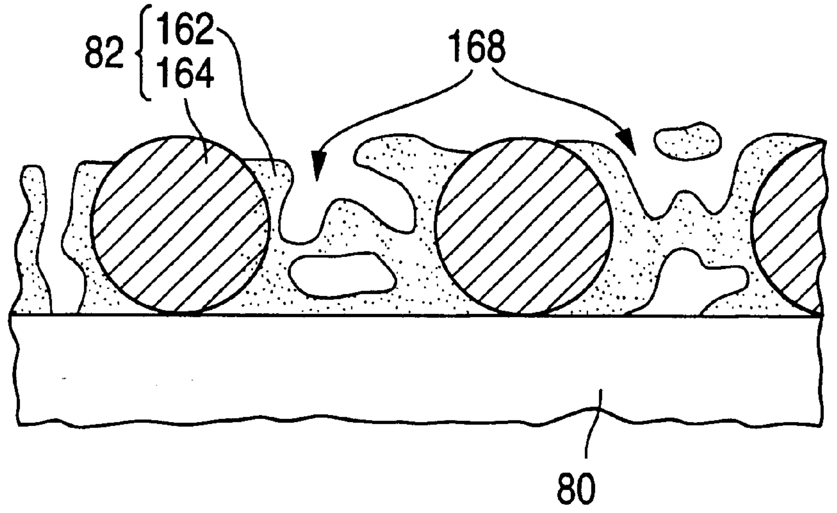
Figure 19C:
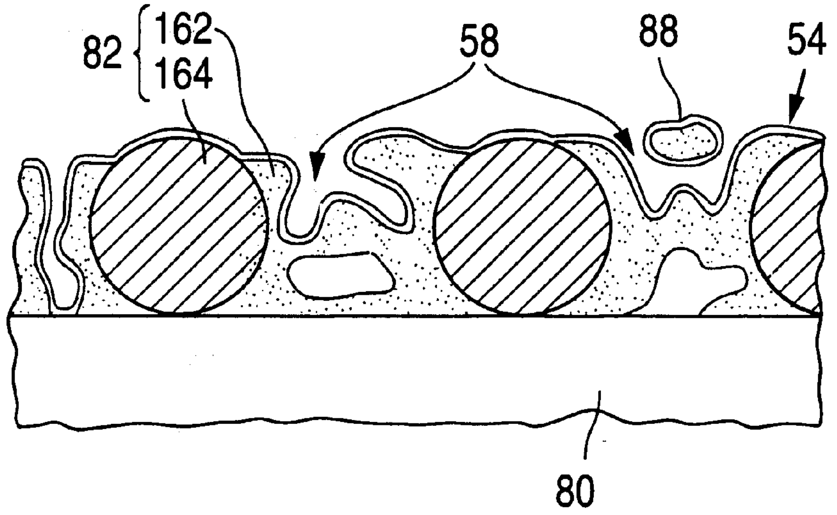

FIGS. 19*a*–19*c* (collectively "FIG. 19") illustrate a process for manufacturing a structure such as main wall 46 in which porous layer 82 is formed with base layer 162 and resistivity-modifying regions 164 to provide a directional resistivity characteristic of the type described above in connection with FIGS. 17 and 18. The process of FIG. 19 begins with core substrate 80. A pair of largely identical thin liquid-containing layer-like bodies 166 are formed on the opposite faces of core substrate 80. FIG. 19*a* depicts one of liquidous layers 166.

Each liquid-containing layer 166 consists of resistivity-modifying regions 164, a ceramic precursor to base layer 162, and a suitable liquid. Subject to producing layer 162 so as normally to be electrically resistive, the ceramic precursor can be any of the ceramic precursor materials described above for thin films 92 in the process of FIG. 6. Hence, the ceramic precursor in liquid-containing layers 166 is typically metallic alkoxide but could alternatively or additionally include other metalorganic or organometallic materials. The liquid is normally an organic solvent of the type described above for films 92.

Liquid-containing layers 166 are formed on core substrate 80 according to any of the techniques described above for creating thin films 92 on substrate 80, subject to one principal limitation. Each layer 166 is normally of a thickness corresponding to no more than approximately a monolayer of resistivity-modifying regions 164 depending on the density of regions 164 in layers 166. Excluding resistivity-modifying regions 164, the minimum thickness of each layer 166 is normally in the vicinity of the average diameter of regions 164.

In subsequent operations, liquid-containing layers 166 are processed substantially the same. Only one of layers 166 is, for simplicity, dealt with in the remainder of the process description for FIG. 19.

The ceramic precursor material in illustrated liquid-containing layer 166 is converted into base layer 162 as depicted in FIG. 19*b*. The liquid in liquid-containing layer 166 is also removed.

The precursor conversion and liquid removal can be performed according to a sol-gel process as described above in connection with the process of FIG. 6. Although not indicated in FIG. 19, liquid-containing layer 166 then goes through a gel stage in which an initial polymeric gel layer laterally surrounds resistivity-modifying regions 164. The liquid is removed without causing the gel to fully collapse. Irregular pores 168 are thereby produced at random locations throughout base layer 162. Regions 164 protrude out of layer 162.

Alternatively, porous layer 82 can be created from resistivity-modifying regions 164 and ceramic precursor particles. In this case, liquid-containing layer 166 consists of a liquid-containing composition of regions 164, ceramic precursor particles, and a suitable liquid, typically water. The ceramic precursor particles typically have the characteristics described above for the ceramic precursor particles in thin films 92 in the process of FIG. 6. Likewise, layer 166 is processed in substantially the same way that each layer 92 is processed when it consists of ceramic precursor particles and liquid. As a further alternative, layer 82 can be created from resistivity-modifying regions 164 and a combination of polymeric ceramic precursor material and ceramic precursor particles.

Conformal coating 88 consisting of carbon is formed along the exposed face of porous layer 82, including the surfaces of pores 168 situated along the exposed face of layer 82. See FIG. 19*c*. Various techniques can be utilized to form conformal carbon-containing coating 88 here. For example, coating 88 can be formed according to the process of FIG. 15. Alternatively, coating 88 can be formed according to the process of FIG. 14. In this event, the carbon-containing material also defines the surfaces of externally inaccessible pores 58.

As indicated above, item 80 in the process of FIG. 19 represents either core substrate 80 or a larger precursor substrate from which two or more substrates 80 can be made. The structure in FIG. 19*c* then either represents main wall 46 or can be cut into multiple portions to form multiple walls 46. In either case, the formation of electrodes 48, 50, and 52 is integrated with the process of FIG. 19 in the way prescribed above.

The structure of FIG. 19*c*, although being particularly suitable for partial or full use in spacer wall 24, can be employed in other applications. As an example, the structure of FIG. 19*c* can be used in particle detectors such as electron detectors.

Additional Variations

Directional terms such as "lateral", "above", and "below" have been employed in describing the present invention to establish a frame of reference by which the reader can more easily understand how the various parts of the invention fit together. In actual practice, the components of a flat-panel CRT display may be situated at orientations different from that implied by the directional terms used here. Inasmuch as directional terms are used for convenience to facilitate the description, the invention encompasses implementations in which the orientations differ from those strictly covered by the directional terms employed here.

While the invention has been described with reference to particular embodiments, this description is solely for the purpose of illustration and is not to be construed as limiting the scope of the invention claimed below. For instance, the spacers in the spacer system can be formed as posts or as combinations of walls. The cross-section of a spacer post, as viewed along the length of the post, can be shaped in various ways such a circle, an oval, or a rectangle. As viewed along the length of a spacer consisting of a combination of walls, the spacer can be shaped as a "T", an "H", or a cross.

The sheet resistance $R_\square$ of a spacer of arbitrary shape is approximately:

$$R_\square = \frac{RP_{DAV}}{2L} \quad (1)$$

where R is the spacer's resistance between plate structures 20 and 22, $P_{DAV}$ is the average dimension of the perimeter of the spacer as viewed in the forward (or reverse) electron-travel direction, and L is the length of the spacer in the forward (or reverse) electron-travel direction. Ignoring the thickness of a wall-shaped spacer (including a spacer shaped like a curved wall), perimeter $P_{DAV}$ of a wall-shaped spacer is twice its average width $W_{AV}$ as viewed in the forward electron-travel direction. For a wall-shaped spacer, Eq. 1 simplifies to:

$$R_\square = \frac{RW_{AV}}{L} \quad (2)$$

By using Eqs. 1 and 2, the sheet resistance information specified above for main wall 46 in wall-shaped spacer 24 can be correlated to that appropriate to a spacer shaped as a post, as a combination of walls, or in another configuration besides a single wall.

Field emission includes the phenomenon generally termed surface conduction emission. Backplate structure 20 that operates in field-emission mode can be replaced with an electron emitter that operates according to thermionic emission or photoemission. Rather than using control electrodes to selectively extract electrons from the electron-emissive elements, the electron emitter can be provided with electrodes that selectively collect electrons from electron-emissive elements which continuously emit electrons during display operation. Various modifications and cations may thus be made by those skilled in the without departing from the true scope and spirit of invention as defined in the appended claims.

We claim:

1. A structure comprising:

a porous body having a face along which multiple primary pores extend into the porous body; and a coating overlying the porous body's face, extending along the primary pores to coat their surfaces and convert the primary pores into further pores, and consisting principally of carbon, the thickness of the coating having a standard deviation of no more than 20% of the average thickness of the coating.

2. A structure as in claim 1 wherein the standard deviation in the thickness of the coating is no more than 10% of the average thickness of the coating.

3. A structure as in claim 1 wherein the average thickness of the coating is 1–100 nm.

4. A structure as in claim 3 wherein the primary pores have an average diameter of 5–1,000 nm.

5. A structure as in claim 3 wherein the further pores have an average diameter of 1–1,000 nm.

6. A structure as in claim 1 wherein the structure has a porosity of at least 10% along the coating.

7. A structure as in claim 1 wherein the pores are present along largely all of the porous body's face.

8. A structure as in claim 1 wherein the coating is of lower total natural electron yield coefficient than material of the porous body along its face.

9. A structure as in claim 1 wherein the porous body comprises at least one of oxide and hydroxide.

10. A structure as in claim 1 wherein the porous body comprises at least one of: (a) oxide of at least one non-carbon element in Groups 3b, 4b, 5b, 6b, 7b, 8, 1b, 2b, 3a, and 4a of Periods 2–6 of the Periodic Table including the lanthanides; and (b) hydroxide of at least one non-carbon element in Groups 3b, 4b, 5b, 6b, 7b, 8, 1b, 2b, 3a, and 4a of Periods 2–6 of the Periodic Table including the lanthanides.

11. A structure as in claim 1 further including an electrically non-conductive substrate over which the porous body is situated such that the porous body's face is spaced apart from the substrate.

12. A structure as in claim 1 wherein the average thickness of the coating is 5–50 nm.

13. A structure as in claim 3 wherein the primary pores have an average diameter of 5–200 nm.

14. A structure as in claim 3 wherein the further pores have an average diameter of 1–200 nm.

15. A structure as in claim 1 wherein the structure has a porosity of at least 20% along the coating.

16. A structure as in claim 1 wherein the structure has a porosity of at least 40% along the coating.

17. A structure as in claim 1 wherein the structure has a porosity of at least 60% along the coating.

18. A structure as in claim 1 wherein the structure has a porosity of at least 80% along the coating.

19. A structure as in claim 1 wherein the coating is at least 50% carbon.

20. A structure as in claim 1 wherein the coating is at least 80% carbon.

21. A structure as in claim 1 wherein the porous body comprises at least one of: (a) oxide of at least one of silicon, titanium, vanadium, chromium, manganese, iron, germanium, yttrium, zirconium, niobium, molybdenum, tin, cerium, praseodymium, neodymium, europium, and tungsten; and (b) hydroxide of at least one of silicon, titanium, vanadium, chromium, manganese, iron, germanium, yttrium, zirconium, niobium, molybdenum, tin, cerium, praseodymium, neodymium, europium, and tungsten.

22. A structure as in claim 1 wherein the primary pores are randomly distributed relative to one another.

23. A structure comprising:

a porous body having multiple primary pores, part of which are substantially fully enclosed by the porous body so as to be directly externally inaccessible; and a multi-part coating that overlies the porous body and extends along the primary pores to coat their surfaces and convert the primary pores, including those that are directly externally inaccessible, into further pores, the coating consisting principally of carbon.

24. A structure as in claim 23 wherein the average thickness of the coating is 1–100 nm.

25. A structure as in claim 24 wherein the primary pores have an average diameter of 5–1,000 nm.

26. A structure as in claim 23 wherein the structure has a porosity of at least 10% along the coating.

27. A structure as in claim 23 wherein the thickness of the coating has a standard deviation of no more than 20% of the average thickness of the coating.

28. A structure as in claim 23 wherein the standard deviation in the thickness of the coating is no more than 10% of the average thickness of the coating.

29. A structure as in claim 23 wherein the average thickness of the coating is 5–50 nm.

30. A structure as in claim 23 wherein the primary pores have an average diameter of 5–200 nm.

31. A structure as in claim 23 wherein the structure has a porosity of at least 20% along the coating.

32. A structure as in claim 23 wherein the structure has a porosity of at least 40% along the coating.

33. A structure as in claim 23 wherein the coating is at least 50% carbon.

34. A structure as in claim 23 wherein the coating is at least 80% carbon.

35. A structure as in claim 23 wherein the porous body comprises at least one of oxide and hydroxide.

36. A structure as in claim 23 wherein the primary pores are randomly distributed relative to one another.

* * * * *